United States Patent [19]
Inoue et al.

[11] Patent Number: 6,100,919
[45] Date of Patent: *Aug. 8, 2000

[54] FILM IMAGE REPRODUCTION APPARATUS UTILIZING APPARATUS ILLUMINATION CHARACTERISTICS FOR FILM IMAGE REPRODUCTION

[75] Inventors: Manabu Inoue, Kobe; Tsutomu Honda, Sakai; Toru Ishii, Hirakata; Hirokazu Yagura, Sakai; Hideki Nagata, Sakai; Katsuyuki Nanba, Sakai; Kiyoyuki Tomita, Kawachinagano; Yumi Hasegawa, Osaka; Toshiyuki Murai, Nara-ken, all of Japan

[73] Assignee: Minolta Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/524,529

[22] Filed: Sep. 7, 1995

[30] Foreign Application Priority Data

| Sep. 7, 1994 | [JP] | Japan | 6-213932 |
| Sep. 7, 1994 | [JP] | Japan | 8-214086 |
| Sep. 7, 1994 | [JP] | Japan | 6-214087 |
| Sep. 7, 1994 | [JP] | Japan | 6-214088 |
| Sep. 7, 1994 | [JP] | Japan | 6-214089 |
| Sep. 7, 1994 | [JP] | Japan | 6-214090 |
| Sep. 7, 1994 | [JP] | Japan | 6-214091 |

[51] Int. Cl.[7] ............. H04N 5/253; H04N 9/47; H04N 3/36; H04N 9/11
[52] U.S. Cl. .................. 348/46; 348/97; 369/14
[58] Field of Search .............. 348/96, 97, 98, 348/210, 223, 231, 234; 360/3, 101; 369/14

[56] References Cited

U.S. PATENT DOCUMENTS

| 4,482,924 | 11/1984 | Brownstein | 358/302 |
| 4,691,365 | 9/1987 | Nagashima | 382/54 |
| 4,845,551 | 7/1989 | Matsumoto | 358/80 |
| 4,891,692 | 1/1990 | Outa | 358/75 |
| 4,974,096 | 11/1990 | Wash | 358/302 |
| 4,987,439 | 1/1991 | Cloutier | 355/40 |
| 5,006,878 | 4/1991 | Cloutier | 354/412 |
| 5,025,283 | 6/1991 | Robinson | 355/40 |
| 5,027,140 | 6/1991 | Cloutier | 354/76 |
| 5,157,506 | 10/1992 | Hannah | 358/298 |
| 5,210,570 | 5/1993 | Minamisawa et al. | 355/38 |
| 5,289,227 | 2/1994 | Kinjo | 354/402 |
| 5,311,251 | 5/1994 | Roule et al. | 355/77 |
| 5,384,664 | 1/1995 | Koehler | 360/3 |
| 5,447,811 | 9/1995 | Buhr et al. | 430/20 |
| 5,461,439 | 10/1995 | Minakuti et al. | 354/106 |
| 5,475,493 | 12/1995 | Yamana | 356/404 |
| 5,541,644 | 7/1996 | Nanba | 348/96 |

FOREIGN PATENT DOCUMENTS

WO 90/04302  4/1990  WIPO .

Primary Examiner—Douglas W. Olms
Assistant Examiner—David R Vincent
Attorney, Agent, or Firm—Sidley & Austin

[57] ABSTRACT

A film image reproducing apparatus for reproducing images recorded on successive frames of a film includes: an illuminator which illuminates the film; a detector which detects an illuminating characteristic of the illuminator; a recorder which records the illuminating characteristic detected by the detector on the film; a reader which reads the recorded illuminating characteristic; a setter which sets based on the characteristic recorded on the film a condition for picking up a film image; and a picking-up device which picks up the film image at the set picking-up condition.

43 Claims, 33 Drawing Sheets

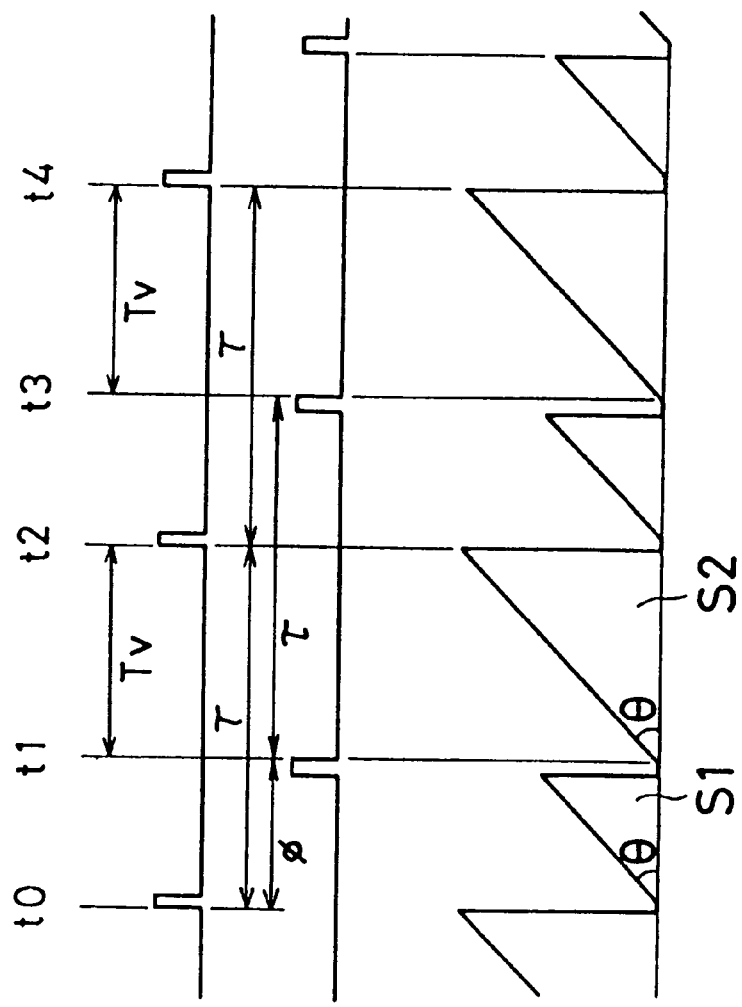

FIG. 29

| G24 | G23 | G22 | G21 | G20 | G19 |
|-----|-----|-----|-----|-----|-----|
| G18 | G17 | G16 |     |     |     |
|     |     |     |     |     |     |
|     |     |     |     |     |     |

FILM IMAGE REPRODUCTION APPARATUS UTILIZING APPARATUS ILLUMINATION CHARACTERISTICS FOR FILM IMAGE REPRODUCTION

BACKGROUND OF THE INVENTION

This invention relates to a film image reproducing apparatus which picks up images recorded in respective frames of a developed film and displays them on a display device such as a monitor television set (hereinafter, referred to as "monitor TV").

There has been proposed a film image reproducing apparatus for picking up images recorded in respective frames of a developed film (hereinafter, referred to as "film image") by means of an image sensor such as a CCD (Charge Coupled Device), and displaying the picked up images on a monitor TV.

In such a film image reproducing apparatus, immediately before picking up each film image for reproduction, a specified part of the film image is sensed to obtain film image information regarding a present density and color tone of the film image at a present illumination state of a light source, e.g., halogen lamp. The obtained film image information is used to pick up the film image in the full scale and reproduce it on the monitor TV. Specifically, picking-up conditions of the reproducing apparatus, such as the exposure time of the image sensor, are controlled based on the obtained film image information to reproduce the film image properly.

Further, there has been proposed a film image reproducing apparatus capable of setting picking-up conditions based on not only film image information but also photographing light information recorded on the film. Specifically, photographing light information regarding a light source under which photography of the image was actually executed, e.g., natural light, flash light, is recorded on a developed film. The photographing light information is read from the film before picking up each film image for reproduction. Picking-up conditions are set based on the read photographing light information and the obtained film image information.

In such film image reproducing apparatus, film image information is required to be made each time the film image is picked up for reproduction because of the fact that: 1) the picking up of a film image is greatly influenced by an illuminating state or light amount of the light source of the reproducing apparatus; 2) the illuminating capability of the light source of one reproducing apparatus is different from another; 3) the light amount illuminated by the light source changes with time; and 4) accordingly, the picking-up conditions must be set to eliminate fluctuations in the illuminating state of the light source.

As mentioned above, to reproduce film images properly, the preparatory procedure is necessary of sensing a part of each film image before picking up the film image in full-scale. However, it will be apparent that the preparatory film image sensing increases the waiting time until the film image is displayed on the monitor. Accordingly, there has been the demand of reproducing film images properly in a shorter time with eliminating the influence of fluctuation of light amount of the light source.

SUMMARY OF THE INVENTION

It is an object of the present invention to provide a film image reproducing apparatus which has overcome the problems residing in the prior art.

Accordingly, the present invention is directed to a film image reproducing apparatus for reproducing images recorded on successive frames of a film, comprising: an illuminator which illuminates the film; a detector which detects an illuminating characteristic of the illuminator; a recorder which records the illuminating characteristic detected by the detector on the film; a setter which sets based on the characteristic recorded on the film a condition for picking up a film image; and a picking-up device which picks up the film image at the set picking-up condition.

Further, the film image reproducing apparatus may be provided with a discriminator which discriminates whether a loaded film is recorded with an illuminating characteristic.

The setter may be activated to set a picking-up condition based on an illuminating characteristic recorded on the loaded film when the discriminator discriminates the recording of the illuminating characteristic. The recorder may be activated to record a detected characteristic on the film when the discriminator discriminates no recording of any illuminating characteristic.

The detector may be constructed by a common part of the picking up device. The detector may execute detection of an illuminating characteristic based on light illuminating a portion of the film having no film images.

The recorder may be made to record an illuminating characteristic in a leader portion of the film. Also, the recorder may be constructed by a magnetic recording device.

The illuminating characteristic may refer to a brightness or a color of light produced by the illuminator.

Also, the present invention is directed to a film image reproducing apparatus for reproducing images recorded on successive frames of a film, comprising: an illuminator which illuminates the film; a detector which detects an illuminating characteristic of the illuminator; a reader which reads reproduction relevant information recorded on the film; a setter which sets a condition for picking up a film image based on the detected illuminating characteristic and the read reproduction relevant information; and a picking-up device which picks up the film image at the set picking-up condition.

The reproduction relevant information may be recorded in a magnetic recording portion of the film. The reproduction relevant information may refer to a previous illuminating characteristic and a previous picking-up condition. The setter may be made to set a picking-up condition based on the detected illuminating characteristic and the read previous illuminating characteristic. The setter may be provided with a correction discriminator which discriminates based on a comparison between the read previous illuminating characteristic and the detected illuminating characteristic whether it is necessary to correct the read previous picking-up condition.

Further, the present invention is directed to a film image reproducing apparatus for reproducing images recorded on successive frames of a film comprising: an illuminator which illuminates the film; a detector which detects a first illuminating characteristic and a second illuminating characteristic of the illuminator, the first illuminating characteristic being different from the second illuminating characteristic; and a setter which sets a condition for picking up a film image based on the first and second illuminating characteristics detected by the detector.

The first illuminating characteristic may be recorded in a magnetic recording portion of the film. The magnetic recording portion may be provided in a leader portion of the film. The magnetic recording portion may be recorded with a set picking-up condition.

The setter may be made to set a picking-up condition based on the first and second illuminating characteristics. The setter may be constructed by a correction discriminator which discriminates based on a comparison between the first and second illuminating characteristics whether it is necessary to correct a previous set picking-up condition.

The detector may be provided with a sensor which senses light which has been produced by the illuminator and been transmitted through the film, and the second illuminating characteristic is detected based on the light sensed by the sensor. The second illuminating characteristic may be detected based on light which has been transmitted through a portion of the film which has no film images.

With these film image reproducing apparatuses, the detector is provided to detect an illuminating characteristic of the illuminator. The detected illuminating characteristic of the illuminator is recorded on the film. A picking-up condition is set based on the illuminating characteristic recorded on the film. Accordingly, there is not the necessity of detecting an illuminating characteristic of the illuminator or light source each time a film image is reproduced. This will reduce the preparatory time for reproduction and thus ensure display of film images in a shorter time.

Also, there is provided the reader for reading an illuminating characteristic recorded on the film. A picking-up condition is set based on a read illuminating characteristic. Accordingly, a picking-up condition can be set more rapidly, comparing to the conventional manner of detecting an illuminating characteristic immediately before reproduction of each film image.

Further, a picking-up condition is set based on two kinds of illuminating characteristics. There is provided a correction discriminator which discriminates based on a comparison between the two kinds illuminating characteristics whether it is necessary to correct a previous set picking-up condition. Accordingly, a picking-up condition is set taking into account a fluctuation of the illuminator, thereby assuring proper reproduction of film images.

These and other objects, features and advantages of the present invention will become more apparent upon a reading of the following detailed description and accompanying drawings.

BRIEF DESCRIPTION OF THE DRAWINGS

FIGS. 10A to 10C are waveform charts representing an image pick-up operation by a CCD line sensor, FIG. 10A showing a transfer pulse, FIG. 10B showing a reset pulse, and FIG. 10C showing a level of electric charges stored in a sensing portion;

FIG. 29 is a diagram showing an exemplary display of a multi-image displayed on a monitor TV;

DETAILED DESCRIPTION OF THE PREFERRED EMBODIMENTS OF THE INVENTION

Figure 1:
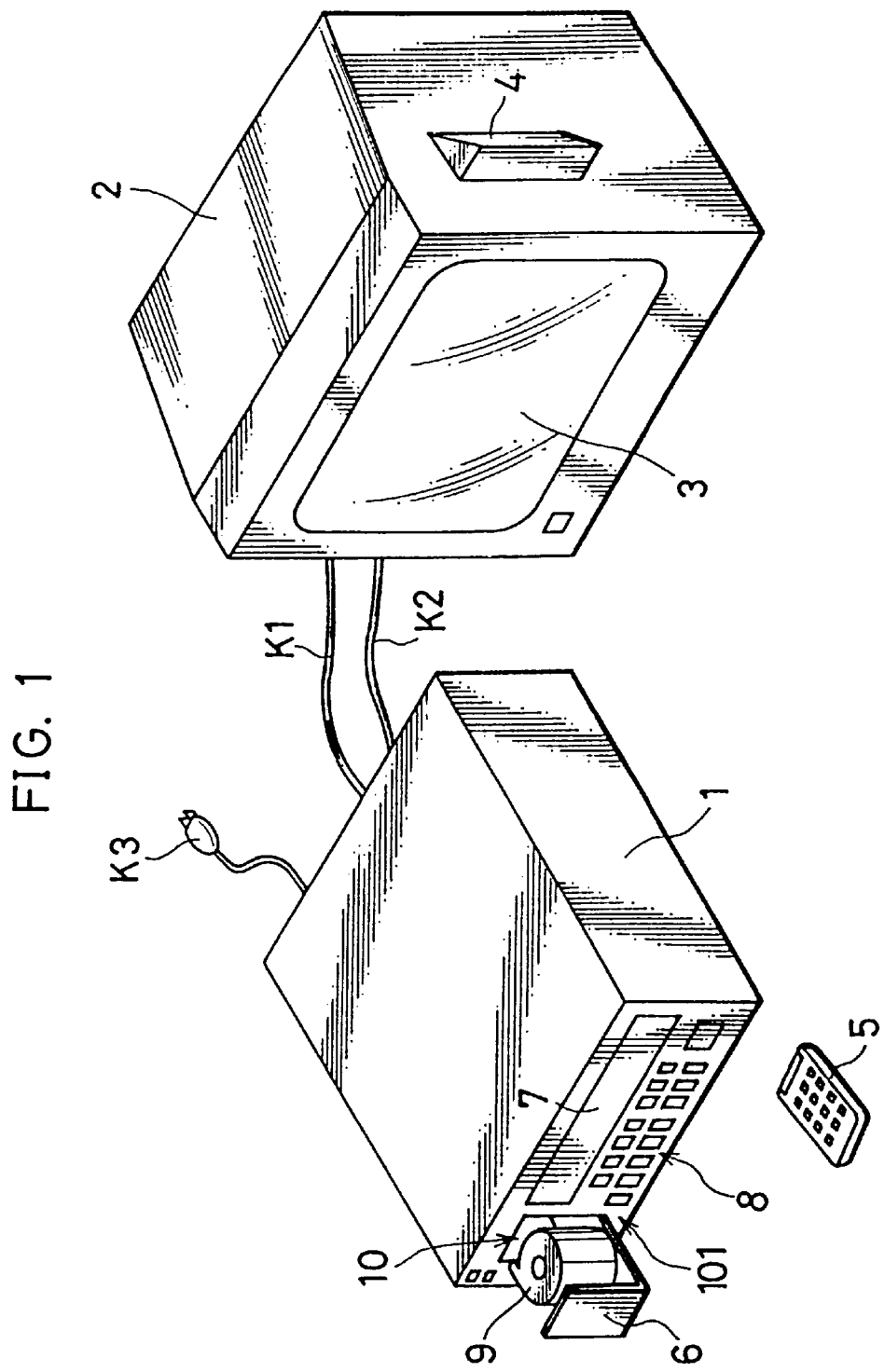
FIG. 1 is a perspective view showing an exterior of a film image reproducing apparatus according to the invention.

FIG. 1 is a perspective view showing an exterior of a film image reproducing apparatus according to the invention.

The film image reproducing apparatus 1 is connected and used with a monitor TV 2 via a cable K1 for video signals and a cable K2 for audio signals. The film image reproducing apparatus 1 picks up images recorded in respective frames F of a developed film 11 (see FIG. 8) contained in a film cartridge 9 by means of an image pick-up device, and reproduces the picked up images on the monitor TV 2 (display means) in accordance with set presentation conditions.

The presentation conditions include those concerning the reproduction of the film images and those concerning effect sounds such as BGM (background music). Both kinds of presentation conditions are set by the use of an operation unit 8 of the film image reproducing apparatus 1. The film images are reproduced and displayed on a screen of the monitor TV 2, and the effect sounds are made audible by a pair of loudspeakers 4 disposed on the opposite side surfaces of the monitor TV 2.

The presentation conditions concerning the reproduction of the film images include reproduction by fade-in/fade-out, reproduction by panning (the film images are reproduced while being panned from the left end to the right side, or from the bottom end to the upper side), reproduction by zooming-up, and superimposition of character information.

When setting the presentation conditions concerning the reproduction, the reproduction conditions are set besides the presentation conditions. For example, frame(s) to be reproduced is/are designated; an order in which the designated frames are reproduced is set; the vertical direction of the image is inverted; and the vertically framed image is converted into a horizontally framed image, and vice versa. The presentation conditions concerning the effect sounds mainly include the playing of BGM corresponding to the reproduction conditions of the respective film images. However, narration may be inserted if necessary. The presentation conditions are set during the editing by the film image reproducing apparatus 1, and are recorded on magnetic recording portions 116A, 116B, 117A and 117B (see FIG. 8) of the film 11.

The film image reproducing apparatus 1 has a front panel 101 including an eject table 6, a display unit 7, and the operation unit 8. Operations such as the reproduction of the film images and the setting of the presentation conditions are performed by means of a variety of switches.

The film image reproducing apparatus 1 also includes a remote controller 5. Therefore, the above operations can be performed by means of the remote controller 5, instead of the operation unit 8.

The eject table 6 is adapted to set the film cartridge 9 in a film loader 12 (see FIG. 3) provided in the film image reproducing apparatus 1. At the left part of the front panel 101, the eject table 6 is slidably mounted such that it can project and retract with respect to the front panel 101. A rewind fork (not shown) stands upright on the bottom surface of the eject table 6. The film cartridge 9 is set in the eject table 6 by fitting a drive hole 911 of a spool 91 over the rewind fork (see FIG. 5).

Figure 2:
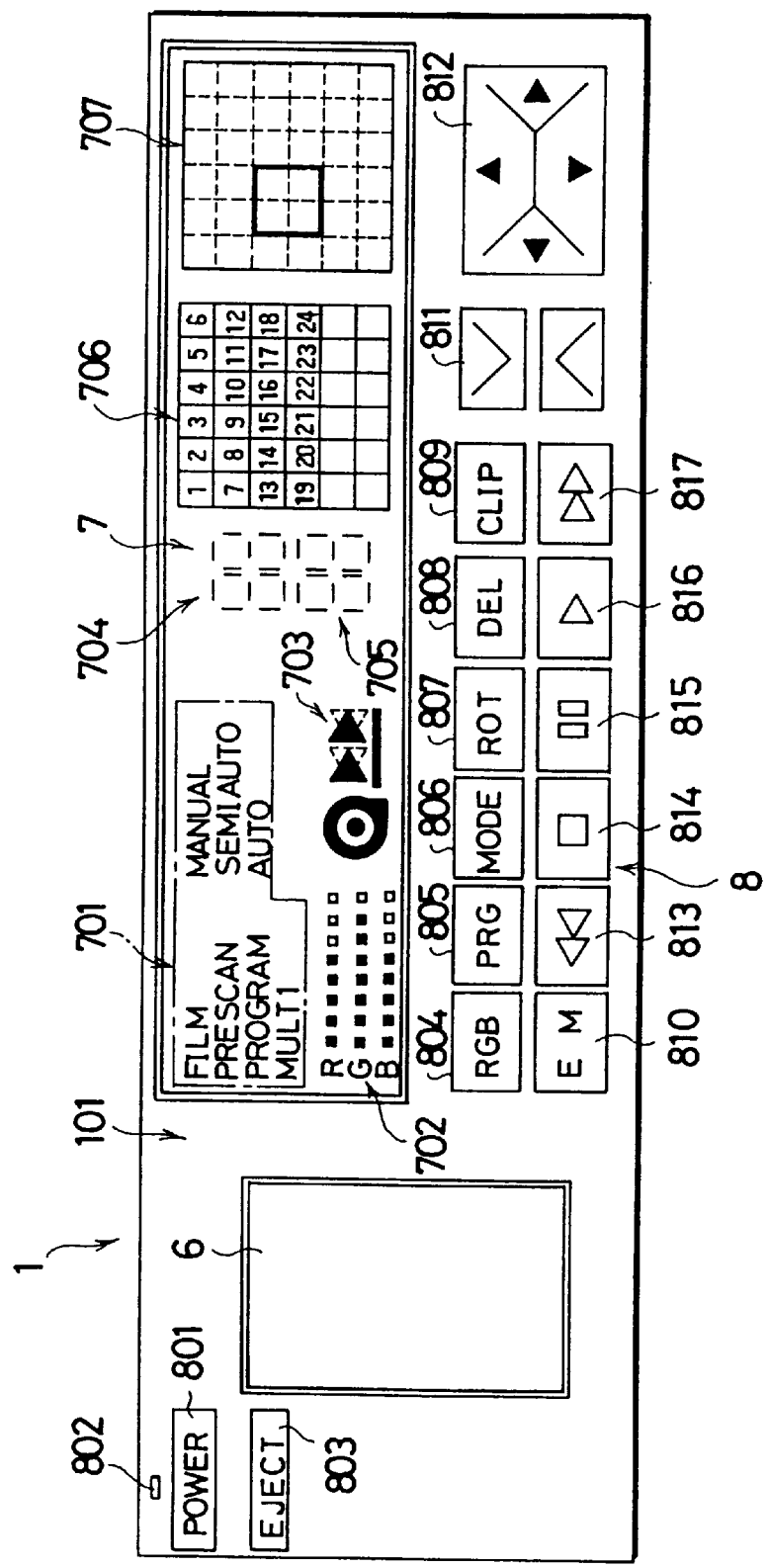
FIG. 2 is a front view of a front panel of the film image reproducing apparatus.

The display unit 7 is disposed at a right upper part of the front panel 101, and includes a plurality of display areas 701 to 707 for displaying a variety of information as shown in FIG. 2. The display area 701 is adapted to display set states of the respective modes such as a film reading mode, a program mode, a reproduction mode and a presentation mode. The display area 702 is adapted to display a color adjustment of an image being reproduced on the monitor TV 2 (hereinafter, referred to "reproduced image"). Specifically, levels of components of the respective color signals of R, G and B are displayed. The display area 703 is adapted to display the presence, the loading and the feeding of the film 11. The respective states are represented by symbol marks.

The display area 704 is adapted to display a frame number in a digital manner. The display area 705 is adapted to display the number of musics used as effect sounds in a digital manner. The film image reproducing apparatus 1 has a built-in music recording medium in which a plurality of musics are recorded in advance, and selects the effect sounds from the musics recorded on the music recording medium when the presentation conditions are set. The number of the musics selected or set during the setting of the presentation conditions or during the actual reproduction of the film images is displayed in the display area 705.

The display area 706 is adapted to display numbers of all the frames picked up from the film 11 in a two-dimensional matrix. The display area 707 is adapted to display a clipping area of the reproduced image.

The operation unit 8 includes a power switch (power stop designation means) 801 disposed at a left upper part of the front panel 101, a power lamp 802, an eject switch 803, switches 804 to 817 arranged below the display unit 7.

The power switch 801 is a main power switch of the film image reproducing apparatus 1. Each time the power switch 801 is pressed, the state thereof is alternately changed between ON and OFF. The film image reproducing apparatus 1 is activated when the power switch 801 is turned on, whereas it is stopped when the power switch 801 is turned off. The power lamp 802 indicates the state of the power switch 801. The power lamp 802 is turned on when the power switch 801 is on, while being turned off when the power switch 801 is off.

The eject switch 803 is operated to discharge and insert the eject table 6, and the state thereof is alternately changed between ON and OFF each time it is pressed. The eject table 6 is accommodated in the film image reproducing apparatus 1 when the eject switch 803 is turned on, while being discharged from the film image reproducing apparatus 1 when the eject switch 803 is turned off.

The switches 804 to 812 are operated to set the presentation conditions, and the switches 813 to 817 are operated to designate the feeding of the film 11 and the reproduction.

A color adjustment switch 804 constitutes a switch for adjusting the respective colors of R, G and B of the reproduced image together with a zoom switch 811. The color to be changed is adjusted by means of the color adjustment switch 804, and the color signal level is adjusted by means of the zoom switch 811. The adjusted states of the respective colors during the color adjustment are represented in the levels of the respective colors of R, G and B in the display area 702. An operator can adjust the color while viewing the display in the display area 702.

The program switch 805 is operated to set a program mode (a mode for programming the presentation conditions). The mode switch 806 is operated to change the presentation mode. The film image reproducing apparatus 1 has a plurality of presentation modes including, for example, one in which the film image is reproduced in accordance with the manually set presentation conditions, and one in which the film image is reproduced in accordance with a program set by the program mode. These presentation modes are changed by means of the mode switch 806.

A rotation switch 807 constitutes a switch for rotating the reproduced image together with a panning switch 812. An image rotation mode is set by means of the rotation switch 807, and a rotating amount is set by the panning switch 812. Together with the panning switch 812, a delete switch 808 constitutes a switch for designating the film image(s), out of the read film images, which need not be reproduced and for editing the film images to be reproduced. A deletion mode is set by means of the delete switch 808, and the frames needed not to be reproduced are designated by means of the panning switch 812.

A clip switch 809 is operated to clip the film image. A selection switch 810 is operated to change the presentation conditions (images or music) which are to be manually set.

The zoom switch 811 is operated to enlarge and shrink the reproduced image. The panning switch 812 is operated to control a cursor or reproduction area displayed on the screen 3 of the monitor TV 2 during the editing. As described above, the zoom switch 811 and the panning switch 812 perform a plurality of functions in combination with the other switches, respectively.

A rewind switch 813 is operated to designate a high speed rewinding of the dispensed film 11 into the film cartridge 9. A stop switch 814 is operated to designate a stop of the film 11 being fed. A temporary stop switch 815 is operated to temporarily stop the feeding of the film 11 during the reproduction. A reproduction switch 816 is operated to designate the reproduction of the film image. A rapid forward switch 817 is operated to designate a high speed feeding of the film 11 from the film cartridge 9.

Figure 5:
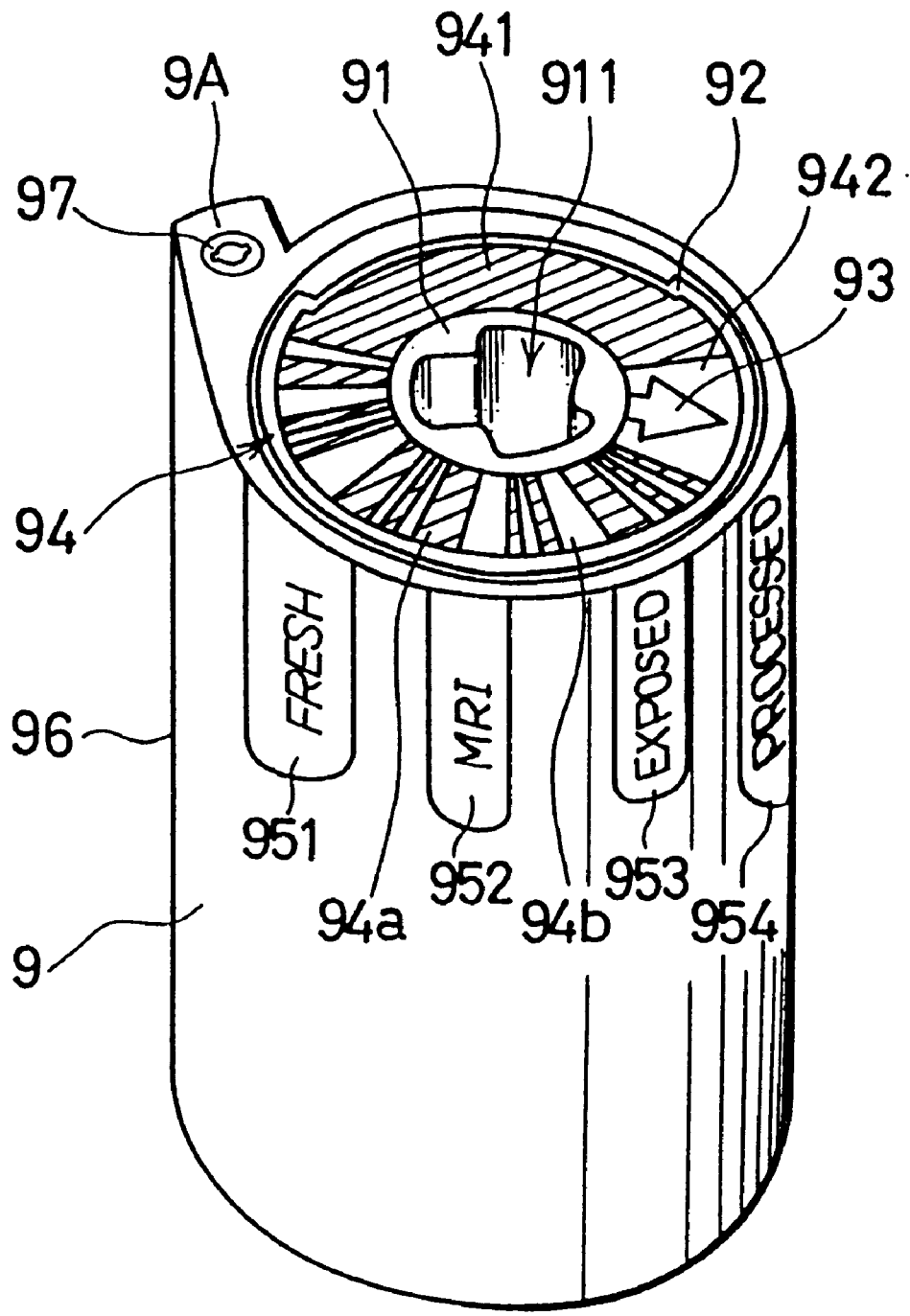
FIG. 5 is a perspective view showing a film cartridge used in the film image reproducing apparatus.
Figure 6:
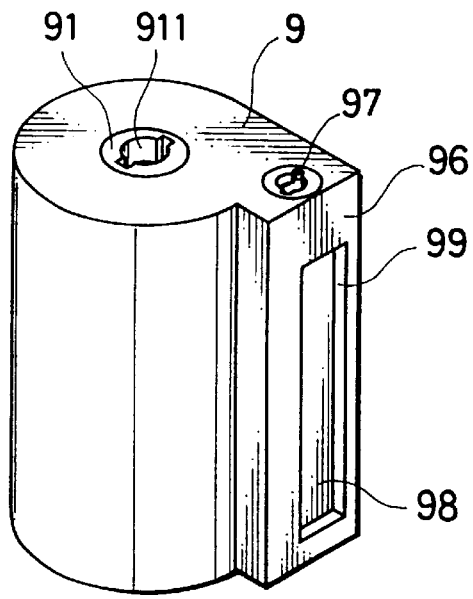
FIG. 6 is a perspective view of the film cartridge when a film is entirely accommodated therein.
Figure 7:
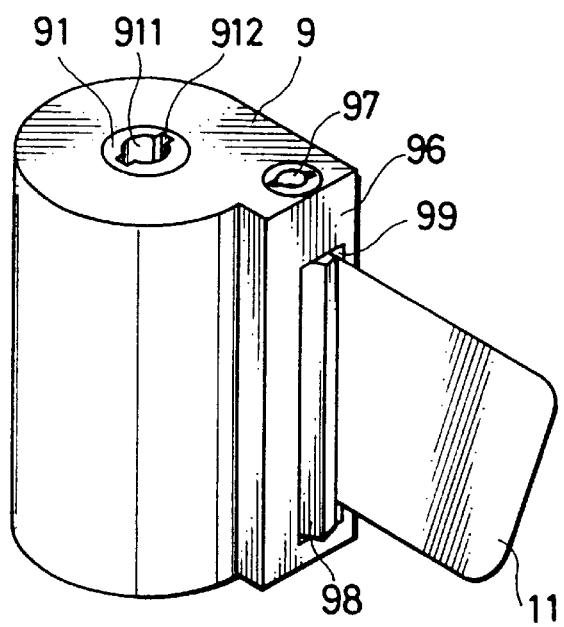
FIG. 7 is a perspective view of the film cartridge when a part of the film is dispensed therefrom.

FIG. 5 is a perspective view of the film cartridge used in the film image reproducing apparatus 1; FIG. 6 is a perspective view of the film cartridge when a film is contained therein; and FIG. 7 is a perspective view of the film cartridge when the film is dispensed therefrom, The film cartridge 9 is cylindrical and has a feeding portion 96 for feeding the film 11. The feeding portion projects from a side surface of the film cartridge 9 in parallel with its shaft. At the leading end of the feeding portion 96, an outlet 99 for the film 11 is formed. A light blocking lid 98 is openably and closably mounted at the outlet 99 (see FIG. 6). The film cartridge 9 also includes the spool 91 for taking up the film 11 around its shaft, and an opening shaft 97, in a suitable position of the feeding portion 96, for opening and closing the light blocking lid 98.

When the film cartridge 9 is not set in the film image reproducing apparatus 1, the film 11 is completely contained therein and the outlet 99 is closed by the light blocking lid 98 so that the film 11 cannot be easily taken out of the film cartridge 9.

Further, the film image reproducing apparatus 1 has an automatic loading mechanism to be described later. When the film cartridge 9 is set in the film loader 12 (see FIG. 3), the opening shaft 97 is rotated to retract the lid 98 from the outlet 99 (i.e. to open the outlet 99), and the spool 91 is rotated to pull a film leader 11A of the film 11 from the film cartridge main body (see FIG. 7). The pulled film leader 11A is automatically wound around a take-up spool 153 (see FIG. 3) provided in the film loader 12, so that the film images in the respective frames of the film 11 being fed can be read.

The film cartridge 9 has, at one end of the spool 91, a data disk 92 showing information peculiar to the film (hereinafter, referred to as "film information") in a bar code 94. The film information includes a film sensitivity, a kind of the film (color/monochromatic film, negative/positive, etc.), the number of frames, etc. For the sake of convenience, the bar code 94 is specified as follows in this specification: hatched black portions 94a, white portions 94b, a wide black zone 941, and a wide white zone 942 are referred to as bars, spaces, a black zone, and a quiet zone, respectively.

The data disk 92 is in flush with an end face 9A of the main body of the cartridge 9, and is rotatable together with the spool 91. On the center axis of the spool 91, there is formed the drive hole 911 fittable with the rewind fork provided at the eject table 6.

Except the black zone 941 and the quiet zone 942, 11 each of bars 94a and the spaces 94b are provided on the data disk 92. There are two kinds of bars 94a and the spaces 94b depending on their width: wide bars and narrow bars, wide spaces and narrow spaces. The film information is determined by the combination of these bars 94a and spaces 94b. The bar 94a and the space 94b abutting the quiet zone 942 and the black zone 941, respectively, are both narrow. In this embodiment, the wide bars and spaces are three times as wide as the narrow bars and spaces.

An indicator mark 93 in the shape of an arrow for indicating the used state of the film 11 is provided on the data disk 92. There are four display marks 951 to 954 for displaying the used state of the film 11 contained in the cartridge 9 on the outer circumferential surface of the cartridge main body.

The display marks 951 to 954 consist of characters. The display mark 951 "FRESH" represents an unexposed state; the display mark 952 "MRI" represents that the film is exposed up to a certain frame; the display mark 953 "EXPOSED" represents that all the frames are already exposed; and the display mark 954 "PROCESSED" represents that the film is developed. It should be appreciated that the display marks 951 to 954 may be symbols or signs.

The used state of the film 11 in the cartridge 9 can be grasped by seeing at which display mark 951 to 954 the indicator mark 93 points. For example, if the indicator mark 93 points at the display mark 951 "FRESH", the film 11 is unexposed, If the indicator mark 93 points at the display mark 952 "MRI", the film 11 is exposed up to a certain frame.

Figure 8:
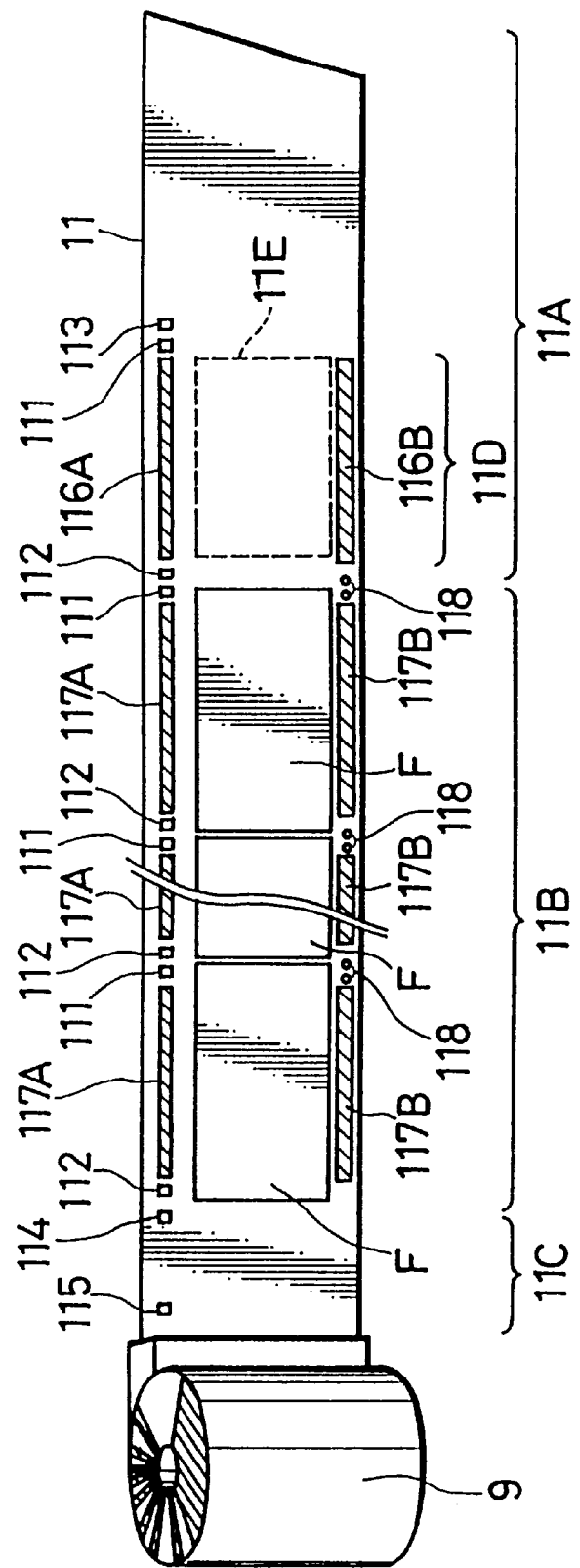
FIG. 8 is a perspective view showing a structure of the film contained in the cartridge and used in the film image reproducing apparatus.

FIG. 8 shows a structure of the film used in the film image reproducing apparatus 1.

The film 11 contained in the film cartridge 9 has three areas: the film leader 11A, an image recording area 11b, and a film end 11C.

The film leader 11A is provided so that the film 11 can be easily pulled from the film cartridge 9. An unexposed area 11D of substantially the same size as one frame is provided at a rear part of the film leader 11A. In the image recording area 11B, a specified number of images are recorded at specified pitches. The images in the respective frames F have an aspect ratio (vertical dimension:horizontal dimension=9:16) of high vision size which is longer in the horizontal direction than an aspect ratio (3:4) of normal size. The film end 11C is an unexposed area provided at a rear end of the film 11 so that the image recording area 11B can be pulled from the cartridge 9 by a specified distance.

In the description below, the directions of the film images of the respective frames F, corresponding to the longitudinal and widthwise directions of the film, are, if necessary, referred to as horizontal and vertical directions so as to conform to the composition of the screen.

A plurality of rectangular perforations 111 to 115 are formed at the left edge of the film 11 with respect to a pulling direction of the film 11, i.e., at the upper edge of the film 11. The perforations 111 and 112 indicate the positions of the unexposed area 11D and the respective frames F. The perforations 111 are formed at the front end positions of the unexposed area 11D and the frames F, whereas the perforations 112 are formed at the rear end positions of the unexposed area 11D and the frames F. The perforation 113 indicates the start of magnetic recording portions 116A and 116B of the film leader 11A, and is formed before the perforation 111 indicating the front end position of the unexposed area 11D by a predetermined distance. The perforation 114 indicates the front end position of the film end 11C, and is formed behind the perforation 112 indicating the rear end position of the last frame F by a predetermined distance. The perforation 115 indicates the rear end position of the film end 11C, and is formed behind the perforation 114 by a predetermined distance.

The horizontal dimension of the film end 11C is set shorter than the horizontal dimension of each frame F, and a distance between the perforations 114 and 115 is shorter than a distance between the perforations 111 and 112 for each frame F.

The perforations 111 to 115 are detected by a photoreflector. Using the detection signal, whether or not the automatic loading is performed well is discriminated; a position where the reading of the film image of the frames F is started is set; and the rear end of the film 11 is detected. These operations will be described in detailed later.

Information concerning a format in accordance with which the film image is to be reproduced (hereinafter, referred to as "format information") is optically recorded below a lower right corner of the film image of each frame F. The format information designates an aspect ratio of the image recorded in each frame F out of three aspect ratios corresponding to a normal size, a high vision size and a panorama size. The format information consists of two digits, and is optically recorded.

Figure 9A:
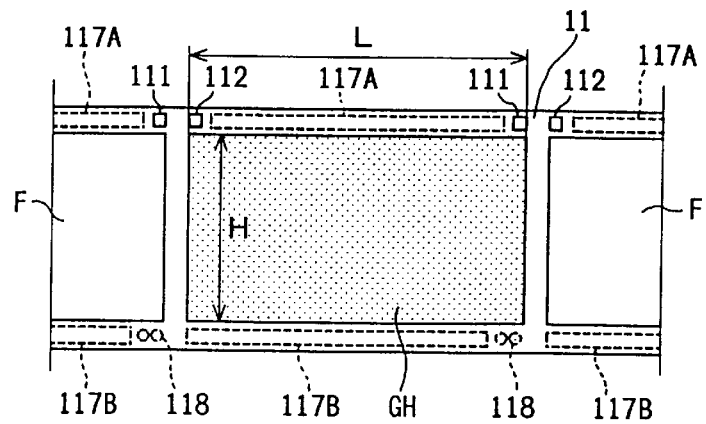
FIGS. 9A to 9C show examples of format information optically recorded on the film, FIG. 9A showing the film on which format information corresponding to a high vision size is recorded, FIG. 9B showing the film on which format information corresponding to a normal size is recorded, and FIG. 9C showing the film on which format information corresponding to a panorama size is recorded.
Figure 9B:
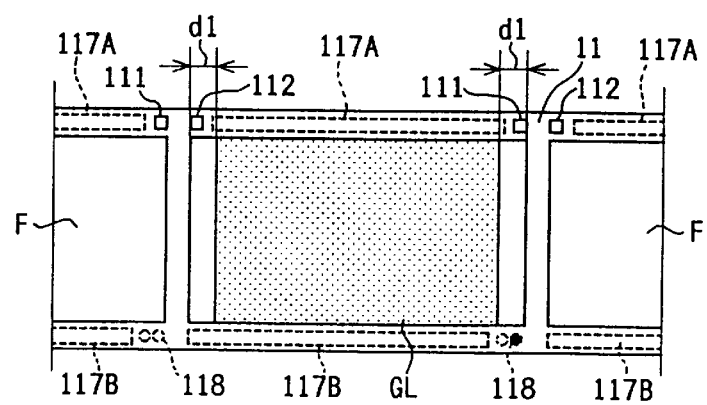
Figure 9C:
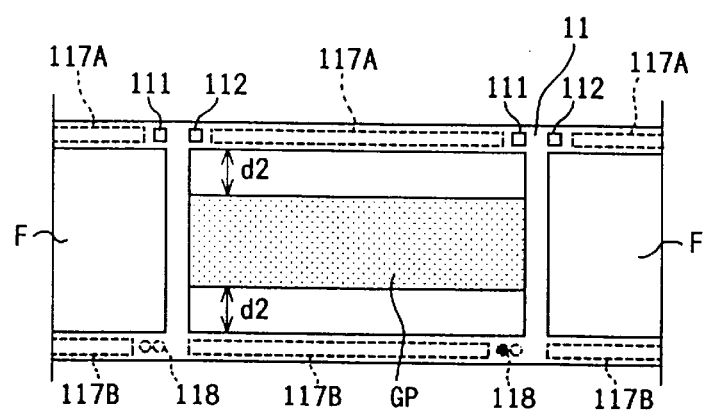

FIGS. 9A to 9C show examples of format information optically recorded on the film, FIG. 9A showing the film on which the format information corresponding to the high vision size is recorded, FIG. 9B showing the film on which the format information corresponding to the normal size is recorded, and FIG. 9C showing the film on which the format information corresponding to the panorama size is recorded.

In this embodiment, three kinds of two-bit information (01), (00) and (10) are assigned as the format information corresponding to the normal size, the high vision size, and the panorama size, respectively. The two-bit information is optically recorded on the film by spot-exposing the bit "1". In FIGS. 9A to 9C, "●" and "○" denote the bits "1" and "0", respectively.

In the case of the high vision size, since the two-bit information is (00), no optically recorded information (hereinafter, referred to as "optical information") is found in the frame F recorded in the high vision size (see FIG. 9A). For the frame F of the high vision size, an image GH indicated by dots in FIG. 9A is reproduced.

For the frame F recorded in the normal size, an image having an aspect ratio of 3:4 (an image GL indicated by dots in FIG. 9B) is reproduced. Specifically, the opposite lateral edges of the image GL are located inward of those of the film image by a specified distance d1 (=5L/64), respectively.

For the frame F recorded in the panorama size, an image having an aspect ratio of 3:1 (an image GP indicated by dots in FIG. 9C) is reproduced. Specifically, the upper and lower edges of the image GP are located inward of those of the film image by a specified distance d2 (=H/4), respectively.

The two-bit information corresponding to the respective sizes are not limited to the above, but any desired two-bit information may be suitably assigned thereto. Further, instead of the bit "1", the bit "0" may be spot-exposed. The representation of the two-bit information is not limited to the sequence of points, but may be a bar code.

Although the format information is represented by the optically recorded two-bit information in this embodiment, the same mark may be formed in different positions corresponding to the respective sizes to represent the format information. Alternatively, marks having different sizes or shapes may be so formed as to correspond to the respective sizes.

Referring back to FIG. 8, strap-like magnetic recording portions 116A and 116B, 117A and 117B are formed at upper and lower edges of the film 11 in correspondence with the unexposed area 11D and the respective frames F.

The upper magnetic recording portion 116A is formed between the perforations 111 and 112 indicating the front and rear end positions of the unexposed area 11D, respectively. The upper magnetic recording portion 117A is formed between the perforations 111 and 112 indicating the front and rear end positions of each frame F. The lower magnetic recording portion 117B corresponding to each frame F is formed adjacent to the corresponding optical information 118.

The information recorded in the magnetic recording portions 116A and 116B includes index information concerning the film 11 (e.g., the number of photographed images, the title of the photographed contents, the frame size (half size/full size, etc)), a characteristic of a light source of the film image reproducing apparatus 1 (characteristics of brightness of a lamp as a light source and of a color balance), and information generally concerning the film 11 such as presentation conditions. Hereinafter, the above information is referred to as "leader information".

The index information is automatically or manually recorded by an operator during the photographing operation. The characteristic of the light source is detected when the film images of the developed film 11 is reproduced in the film image reproducing apparatus 1, and is recorded while the film images are reproduced or while the film cartridge 9 is discharged after the completion of the reproduction. The presentation conditions are automatically or manually set by the operator during the editing before the reproduction, and are recorded, for example, while the film cartridge 9 is discharged after the reproduction.

An area between the magnetic recording portions 116A and 116B of the unexposed area 11D is an orange base sensing portion 11E from which density information of the unexposed portion of the film 11 is read.

The developed color film exhibits an orange color at a fixed density even in its unexposed state. The film image of each frame F has a density which is a sum of a density of the orange color (hereinafter, referred to as "base density") and a density corresponding to the photographed image. In order to process the image signal obtained by picking up the film image with a high accuracy, the base density needs to be subtracted from the density of the picked up image. In this embodiment, before the film image of each frame F is reproduced, the orange base sensing portion 11E is sensed to obtain the base density. The image signal picked up by an image pick-up device such as a CCD is corrected based on the base density.

Besides the orange base sensing portion 11E, the base density may be sensed in any unexposed portion of the film 11 such as unexposed portions in the film end 11C and in spaces between the magnetic recording portions 116A and 116B, between the magnetic recording portions 117A and 117B, and between the frames F.

Information peculiar to the film image of each frame F (hereinafter, referred to as "frame information") is recorded in the magnetic recording portions 117A and 117B. The frame information includes information concerning the photographing operation (hereinafter, referred to as "photographing information") and information concerning the development (hereinafter, referred to as "development information"). The development information is recorded in the magnetic recording portion 117A, and the photographing information is recorded in the magnetic recording portion 117B.

The photographing information includes a date of photographing, information whether the image is horizontally or vertically framed (frame composition), an exposure condition, magnification, and is automatically or manually recorded by the operator during the photographing operation. The development information includes an exposure condition and the number of prints to be made, and is recorded during the development.

The frame information can be corrected by means of the film image reproducing apparatus 1, and the corrected frame information is renewably recorded, for example, while the film cartridge 9 is discharged after the reproduction.

Figure 3:
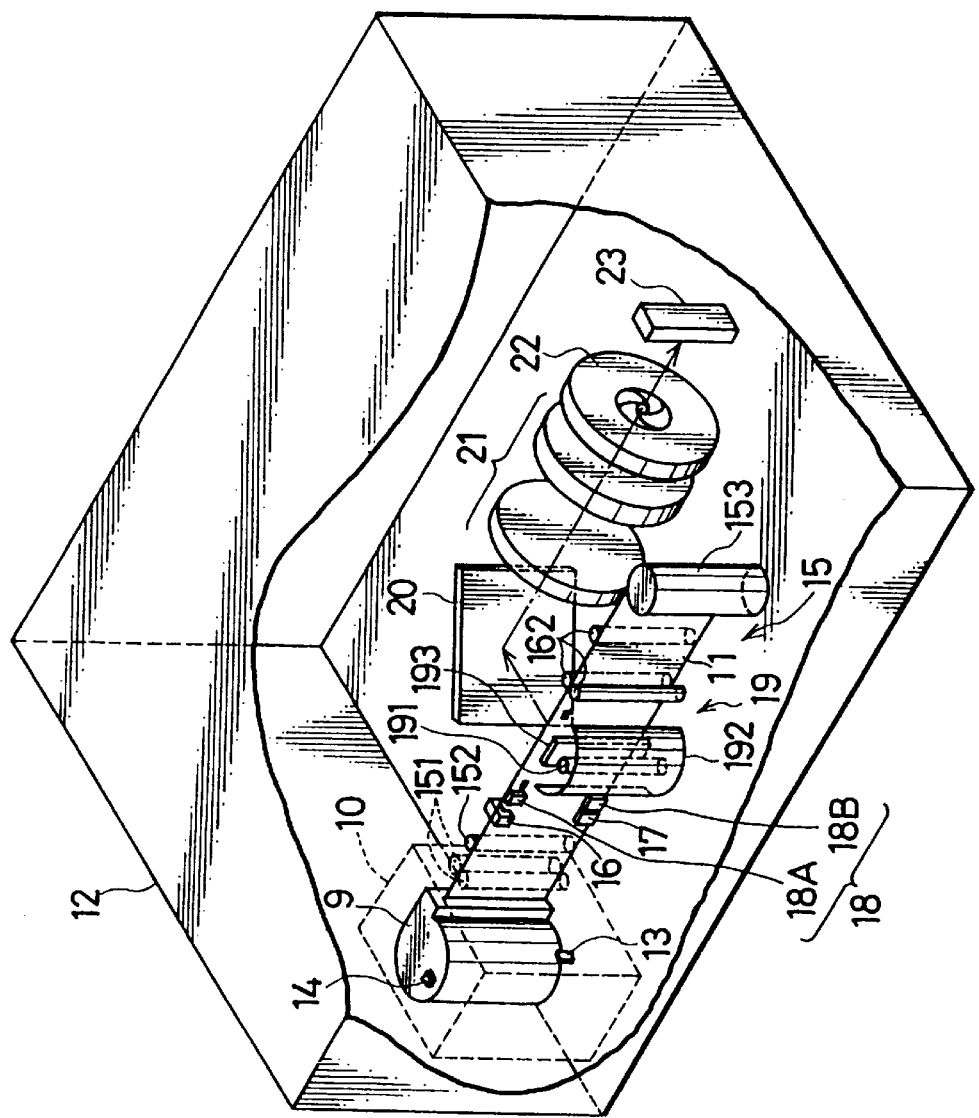
FIG. 3 is a schematic diagram showing a construction of a film loader of the film image reproducing apparatus.

FIG. 3 is a perspective view showing the construction of the film loader 12.

The film loader 12 is provided in an accommodated position of the eject table 6 in the film image reproducing apparatus 1.

A cartridge sensor 13 for detecting the presence of the film cartridge 9 is disposed in a specified position at a lower part of a table container 10 of the eject table 6. Further, a photoreflector 14 for reading the bar code 94 on the upper end face of the film cartridge 9 is disposed in a specified position at an upper part of the table container 10. A detection signal from the cartridge sensor 13 is input to a controller 47 for centrally controlling the entire apparatus. The film information represented by the bar code 94 is read by the photoreflector 14 during the automatic loading of the film 11, and is input to the controller 47.

Beside the table container 10, there is provided a film feeder (film rewinding means) 15 including a pair of feed rollers 151, a guide roller 152 and a take-up spool 153 for taking up the film 11. A photoreflector 16 for detecting the perforations 111 to 115 of the film 11, a photoreflector 17 for reading the optical information, and magnetic heads 18A and 18B for reading and writing the leader information and frame information from and in the magnetic recording portions 116A, 116B, 117A and 117B are arranged in this order downstream from the table container 10 along a feeding path of the film 11 in the film feeder 15.

An illuminating unit 19 for illuminating the film images of the respective frames F is disposed between the magnetic heads 18A, 18B and the take-up spool 153. The illuminating unit 19 includes a light source 191 consisting of a fluorescent lamp, a reflector 192 for projecting the light from the light source 191 toward the film 11, and a diffusing plate 193 for projecting the light from the light source uniformly on the film image.

The illuminating unit 19 is disposed at the right side of the film with respect to its winding direction along the feeding path. A mirror 20 for introducing a light image representing the film image to an image pick-up device 23 is disposed in a position facing the illuminating unit 19 at the left side of the feeding path. A lens 21 for focusing the light image on the image pick-up device 23 and an iris 22 for adjusting an amount of the light incident upon the device 23 are disposed in this order along a path of the light reflected by the mirror 20 between the mirror 20 and the image pick-up device 23.

The image pick-up device (image pick-up means) 23 consists essentially of a color image sensor including three CCD line image sensors which have color filters of, e.g., R, G and B, and are arranged in parallel in a direction normal to a sensor axis. The image pick-up device 23 (hereinafter, referred to as "CCD 23") is so arranged as to conform its sensor axis to the widthwise direction of the projected film image (longitudinal direction in FIG. 8). When the film 11 is fed, the CCD 23 relatively scans the film 11 in the feeding direction to pick up the respective film images.

The CCD 23 has a sensing portion for storing electric charges in proportion to an amount of incident light and converting the light image into an electric signal representing the image (photoelectric conversion), a transferring portion for transferring the stored electric charges from the sensing portion, and a discharging portion for discharging the unnecessary electric charges stored in the sensing portion.

Figure 4A:
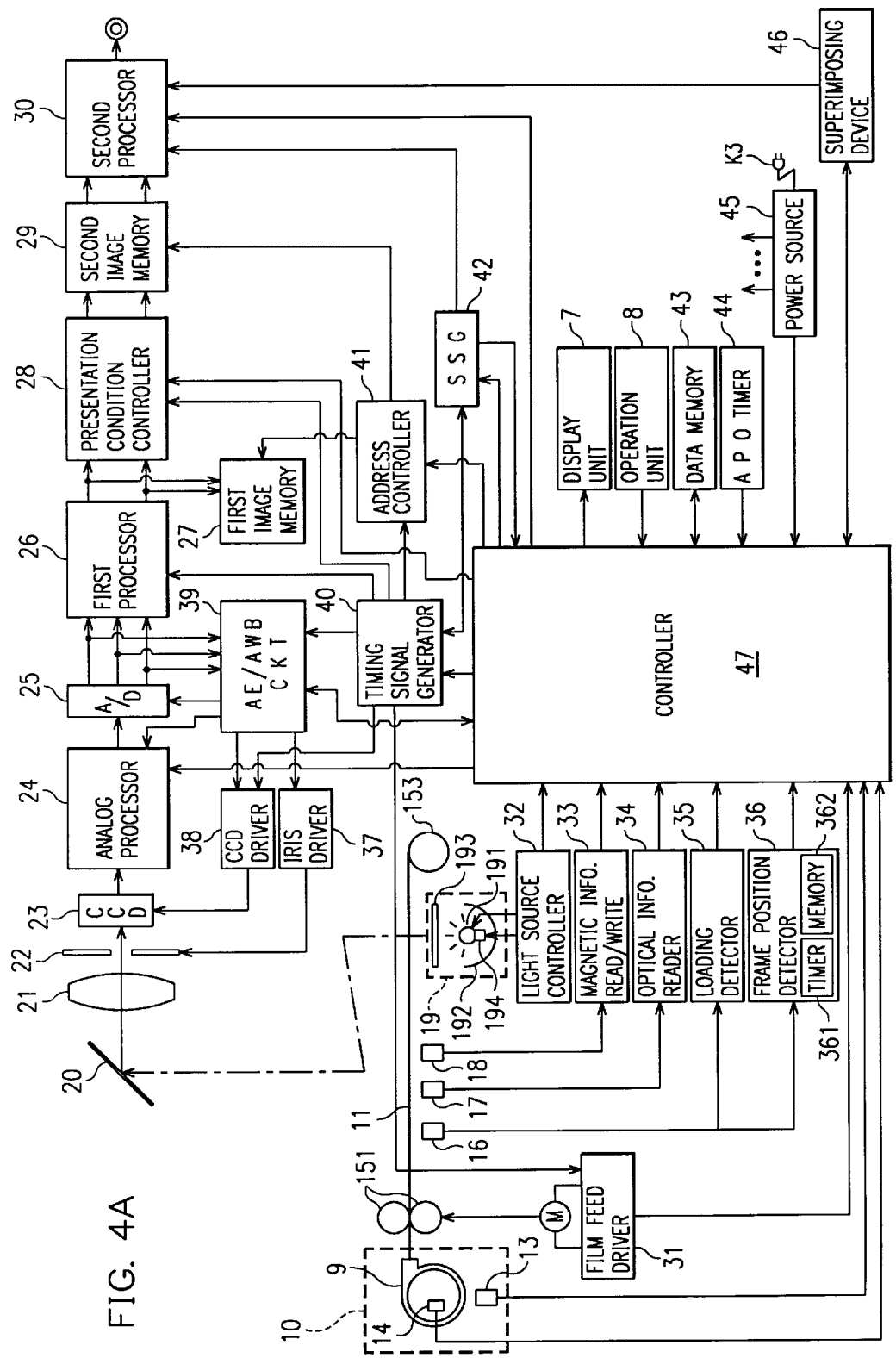
FIGS. 4A and 4B respectively show an embodiment and an alternative embodiment of a block construction diagram representing a control system of the film image reproducing apparatus.

The CCD 23 stores electric charges corresponding to the amount of incident light, i.e., picks up an image by means of the sensing portion, and transfers the stored electric charges to the transferring portion at specified intervals, and outputs a picked up image to an image processor (see FIG. 4A). The CCD 23 alternately repeats the storing of the electric charges and the transfer of the stored electric charges a plurality of times while scanning the film image, and picks up the film image by the line.

FIGS. 10A to 10C are waveform charts representing the image pick-up operation by the CCD 23, FIG. 10A showing a transfer pulse used to control the transfer of the electric charges stored in the sensing portion to the transferring portion, FIG. 10B showing a reset pulse used to control the discharge of the unnecessary electric charges stored in the sensing portion, and FIG. 10C showing a level of electric charges stored in the sensing portion.

The CCD 23 starts the image pick-up operation upon the receipt of an image pick-up start signal from a CCD driver (see FIG. 4A) for controlling the driving of the CCD 23, and stops the image pick-up operation upon the receipt of an image pick-up stop signal. Upon the start of the image pick-up operation, electric charges corresponding to the amount of incident light are stored in the sensing portion. The stored electric charges are transferred to the transferring portion in accordance with a transfer pulse Pt input from the CCD driver 38 in a specified cycle τ, and are output as an image signal to the image processor. The unnecessary electric charges are discharged in accordance with a reset pulse Pr.

The reset pulse Pr is delayed from the transfer pulse Pt by a phase φ, the electric charges stored in the sensing portion are discharged during a period which last until the reset pulse Pr is input after the stored electric charges are output as an image signal in accordance with the transfer Pulse Pr. By controlling an output timing (phase φ) of the reset pulse Pr relative to the transfer pulse Pt, an exposure period of the CCD 23 (corresponding to a shutter speed) is controlled.

For example, with regard to a period between time t0 and time t2 during which the transfer pulse Pt is input, after the stored electric charges are output as an image signal at time t0, electric charges corresponding to an amount of light newly incident upon the sensing portion are stored, and the level of the stored electric charges in the sensing portion increases in proportion to the amount of stored electric charges. An upward inclination θ of the level of the stored electric charges is in proportion to the intensity of the incident light. In other words, the larger the intensity, the larger the upward inclination θ.

When the reset pulse Pr is input at t1 (delayed from time t0 by phase φ), the electric charges stored during the period between time t0 and time t1 (corresponding to an area S1 enclosed by a smaller triangle in FIG. 10C) are discharged as unnecessary electric charges, and electric charges are newly stored in the sensing portion from time t1. When a new transfer pulse Pt is input at time t2 (delayed from time t0 by the specified cycle τ, the electric charges stored during a period between time t1 and time t2 (corresponding to an area S2 enclosed by a larger triangle in FIG. 10C) are transferred to the transferring portion and are output as an image signal.

Accordingly, out of a light receiving period τ between time t0 and time t2 in the sensing portion, a period Tv (=τ−φ) between time t1 and time t2 substantially serves as an exposure period of the CCD 23, i.e. an image pick-up period of the film image. The exposure period Tv corresponds to a shutter speed of a normal camera, and can be controlled by controlling the phase φ as is clear from FIGS. 10A to 10C. In other words, the larger the phase φ is set, the shorter the exposure period Tv becomes, thereby increasing the shutter speed.

FIG. 4A is a block diagram of a control system of the film image reproducing apparatus according to the invention.

In FIG. 4A, elements similar to those shown in FIG. 3 are identified by like or corresponding reference numerals.

An iris driver 37 is a drive circuit for controlling the opening and closing of the iris 22. The CCD driver 38 is a drive circuit for controlling the image pick-up operation by the CCD 23 and the reading of the image signal representing the picked up image.

An analog processor 24 includes signal processing circuits such as a CDS (correlative double sampling) circuit, an analog amplifier and a WB (white balance) circuit. The analog processor 24 applies a specified signal processing to the respective color image signals (analog signals) of R, G and B.

In the analog processor 24, the respective color image signals of R, G and B have their noises suppressed by the CDS circuit, and then are amplified by the analog amplifier to have a specified level. Further, the white balance of the color image signals are automatically corrected by the WB circuit. The WB circuit includes three amplifiers corresponding to the respective color image signals of R, G and B, and corrects the white balance of the color image signals by correcting the level of the image signals of R and B on the basis of the level of the image signal of G.

WB correction values (gains GR and GB of the amplifiers for the color image signals of R and B) are calculated by an AE/AWB (automatic exposure/automatic white balance) calculating circuit 39 to be described later. The WB correction value is input to the WB circuit in synchronism with the input of the image signals thereto.

An analog-digital (A/D) converter 25 converts the analog image signal into a digital image signal (hereinafter, referred to as "image data"). Specifically, the A/D converter 25 converts the respective color image signals of R, G and B into digital color image data, reads parts of the red, green and blue signals, and outputs the red, green and blue image signals in parallel.

While the film image is picked up, the AE/AWB calculating circuit 39 calculates exposure values (aperture value Av and shutter speed Tv), gains of the analog amplifiers in the analog processor 24, and the WB correction values of the WB circuit, and outputs the calculation results to the iris driver 37, the CCD driver 38 and the analog processor 24, respectively. The reason why the calculating circuit 39 reads parts of the red, green and blue image signals is that a memory having a larger capacity is necessary if these signals are entirely read to calculate the exposure value.

A first processor 26 includes a Y correction circuit and a color difference matrix circuit, and applies a Y correction to the respective color image signals input from the A/D converter 25 and converts these color signal into an image signal consisting of a luminance signal (Y-signal) and a chromatic signal (C-signal).

A first image memory 27 is adapted to store the image signal output from the first processor 26. The image memory 27 has a capacity for storing at least one picked up image. During the reproduction, the film images picked up by the CCD 23 are renewably stored in the first image memory 27 one after another.

In order to facilitate the editing and the retrieval of frames to be reproduced, the film image reproducing apparatus 1 has a multi-display function of arranging the film images of all the frames F in a specified two-dimensional pattern to generate a multi-image and displaying the multi-image on the monitor TV 2. Since the film images in the multi-image is small in size compared to the normal reproduced image, the image pick-up operation for the film images for the multi-image is different from the normal image pick-up operation. The obtained image data is compressed and reduced in size, and is stored in the first image memory 27.

Figure 11A:
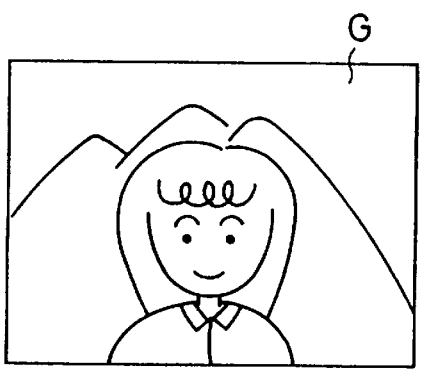
FIGS. 11A to 11C are diagrams showing how a multi-image is generated, FIG. 11A showing a film image, FIG. 11B showing an image picked up for the multi-image, and FIG. 11C showing an image reduced in size for the multi-image.
Figure 11B:
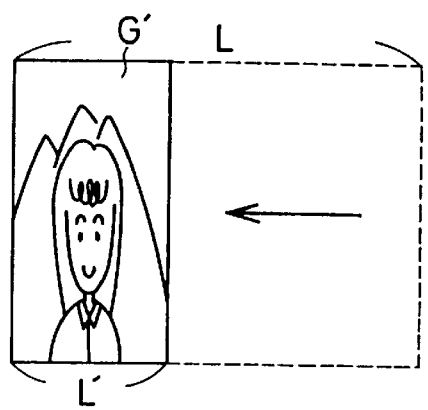
Figure 11C:
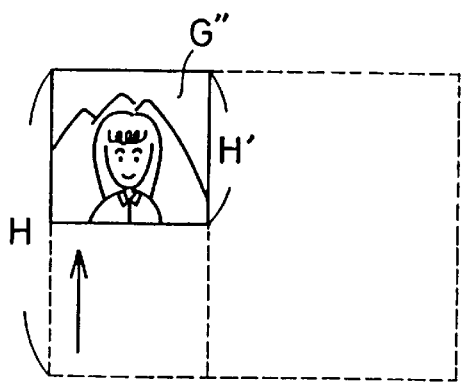

FIGS. 11A to 11C show a method of generating an image reduced in size to be used for the multi-image (hereinafter, referred to as "reduced image"), FIG. 11A showing an original film image, FIG. 11B showing an image picked up to be used for the multi-image, and FIG. 11C showing the reduced image.

In picking up an image for the multi-image, the film image is discontinuously scanned to read a part of the pixel data (data obtained by the respective pixels constituting the CCD 23) representing the film image. This is based on the fact that all pixel data representing the film images are not necessarily required because the images of the respective frames which form the multi-image have a smaller size than the normal reproduced images and need not have high quality.

The discontinuous scanning is such that the image is scanned at a scanning speed for the normal reproduction (hereinafter, referred to as "main scanning speed") only in line positions where the image should be picked up, and is scanned at a speed higher than the main scanning speed in other line positions. For example, assuming that the lines are called the first, second, third, . . . n-th lines from the leading line, if the image is picked up only in line positions of multiples of 6, i.e. 6k-th line positions (where k=1, 2, . . . ) so that it is discontinuously scanned at high speed, the scanning speed during the image pick-up operation for picking up the images for the multi-image is about six time as fast as the main scanning speed. Accordingly, the picked up image G' (see FIG. 11B) is reduced in size in the feeding direction of the film 11 in comparison with the original film image G (see FIG. 11A). A reduction ratio (L'/L) is substantially inversely related to the feeding speed of the film 11, i.e., about ⅙.

The picked up image G' is output from the first processor 26 and is stored in the first image memory 27. During this storage, data representing the picked up image G' is compressed at specified pitches in the longitudinal direction (widthwise direction of the film 11) in accordance with a specified reduction ratio (H'/H). As a result, a reduced image G" as shown in FIG. 11C is stored in the first image memory 27.

The data representing the picked up image G' is compressed by controlling storage addresses of the data in the first image memory 27 by means of an address controller 41.

A presentation condition controller 28 reads the picked up image from the first image memory 27, and applies a specified image processing to the picked up image in accordance with the presentation conditions concerning the reproduction which are input from the controller 47 to generate an image to be reproduced. The specified image processing includes, for example, 90° rotation, 180° rotation, fade-in/fade-out, zooming, panning and clipping.

For example, upon the receipt of the presentation condition of 90° rotation from the controller 47, the presentation condition controller 28 reads the horizontally framed image from the first image memory 27 while converting the same into a vertically framed image, and stores it in the second image memory 29. Further, upon the receipt of the presentation condition of the zooming from the controller 47, the presentation condition controller 28 reads a part of the picked up image stored in the first image memory 27 which falls within a zooming area, enlarges this partial image at a specified magnification to generate an image to be reproduced, and stores the generated image in the second image memory 29.

The second image memory 29 is adapted to store the image output from the presentation condition controller 28, and acts as a buffer memory for the monitor TV 2. The second image memory 29 is capable of reading out the data representing the stored image in accordance with a scan rate of a television.

A second processor 30 converts the image signal consisting of the Y-signal and the C-signal into a NTSC (national television system committee) signal. The second processor 30 converts the image consisting of the Y-signal and the C-signal which image is read from the second image memory 29 into the image represented by the NTSC signal, and sends the converted signal to the monitor TV 2 via the cable K1 for the video signals. Upon the receipt of the character information such as the date of photographing and the frame number from a superimposing device 46, the second processor 30 combines the character information with the image signal to generate an image signal representing an image in which the character information is superimposed in a specified position, converts the generated image signal into the NTSC signal, and sends the NTSC signal to the monitor TV 2.

A film feed driver 31 controls the driving of a motor M which is a driving source for the pair of feed rollers 151. A light source controller 32 controls the driving of the illuminating unit 19. The light source controller 32 includes a heater control circuit for controlling the driving of a heater 194 for the light source, and a light source control circuit for controlling the driving of the light source 191 and an amount light of emitted therefrom. A more suitable control can be performed if the illuminating unit 19 is provided with a temperature sensor for detecting an ambient temperature and is controllably driven in accordance with the amount of emitted light and the ambient temperature.

A magnetic information read/write controller 33 controls the reading and the writing of the magnetic information in and from the magnetic recording portions 116A, 116B, 117A and 117B of the film 11. An optical information reader 34 is adapted to read the format information optically recorded in the respective frames of the film 11. The reader 34 checks the format information based on the detection signal from the photoreflector 17, and outputs the check result to the controller 47.

A loading detector (loading discrimination means) 35 detects whether or not the film 11 in film cartridge 9 set in the film container 10 is loaded.

The loading detector 35 discriminates whether or not the film 11 has been properly loaded by detecting the perforation 111 indicating the leading end of the first frame F based on the detection signal from the photoreflector 16, and outputs the discrimination result to the controller 47. Although the film loading is detected using the detection signal from the photoreflector 16 in this embodiment, there may be provided a sensor for detecting that the film 11 has been wound around the take-up spool 153, and the film loading may be detected based on a detection signal from this sensor. Alternatively, a distance the film is fed after the setting of the film cartridge may be detected from a driven amount of the motor M, and the film loading may be detected based on the fed distance.

A frame position detector 36 detects a reading start position and a reading stop position of the film image of each frame F, and the rear end position of the film 11. The frame position detector 36 includes a timer 361 for detecting the rear end position of the film 11, and a memory 362. The reading start position and the reading stop position where the reading of the image is started and stopped, respectively, are detected by detecting the front end position and the rear end position of each frame F based on the detection signal from the photoreflector 16.

The rear end position of the film 11 is detected by detecting the perforation 115 based on the detection signal from the photoreflector 16. Specifically, the distance between the perforations 114 and 115 indicating the front and rear end positions of the film end 11C is shorter than the distance between the perforations 111 and 112 indicating the front and rear end positions of each frame F. A scanning time during which the film is scanned from the front end position of one frame to the rear end position thereof is counted. The perforation 115 (the rear end position of the film end 11C) is discriminated to have been detected when the present scanning time is shorter than the previous scanning time. The detection of the rear end position of the film 11 is described later.

A timing signal generator 40 generates timing signals to be used in the first processor 26, the presentation condition controller 28, the film feed driver 31, the AE/AWB calculating circuit 39, and the like. The generator 40 generates the timing signals in accordance with a reference clock for the system which is generated by a reference clock generator 42.

The address controller 41 controls addresses of the image data stored in the first image memory 27 and the second image memory 29. The address controller 41 calculates addresses in which the data representing the picked up image are stored in accordance with the control signal input from the controller 47, and outputs the calculation result to the first and second image memories 27 and 29. The address controller 41 also controls the reading of the image stored in the second image memory 29 in accordance with a read timing signal from the controller 47.

A data memory 43 is adapted to store a specified image which is generated in advance such as a title image. The data memory 43 has a storage area from and in which data can be read and written, respectively. The magnetic information read from the film 11 is stored in this storage area. If the magnetic information is corrected by the film image reproducing apparatus 1, the corrected contents are renewably stored in the data memory 43, and this latest magnetic information is renewably stored in the magnetic recording portions 116A, 116B, 117A and 117B of the film 11 at specified timings. The recording timing of the magnetic information in the film 11 is described later.

Figure 12:
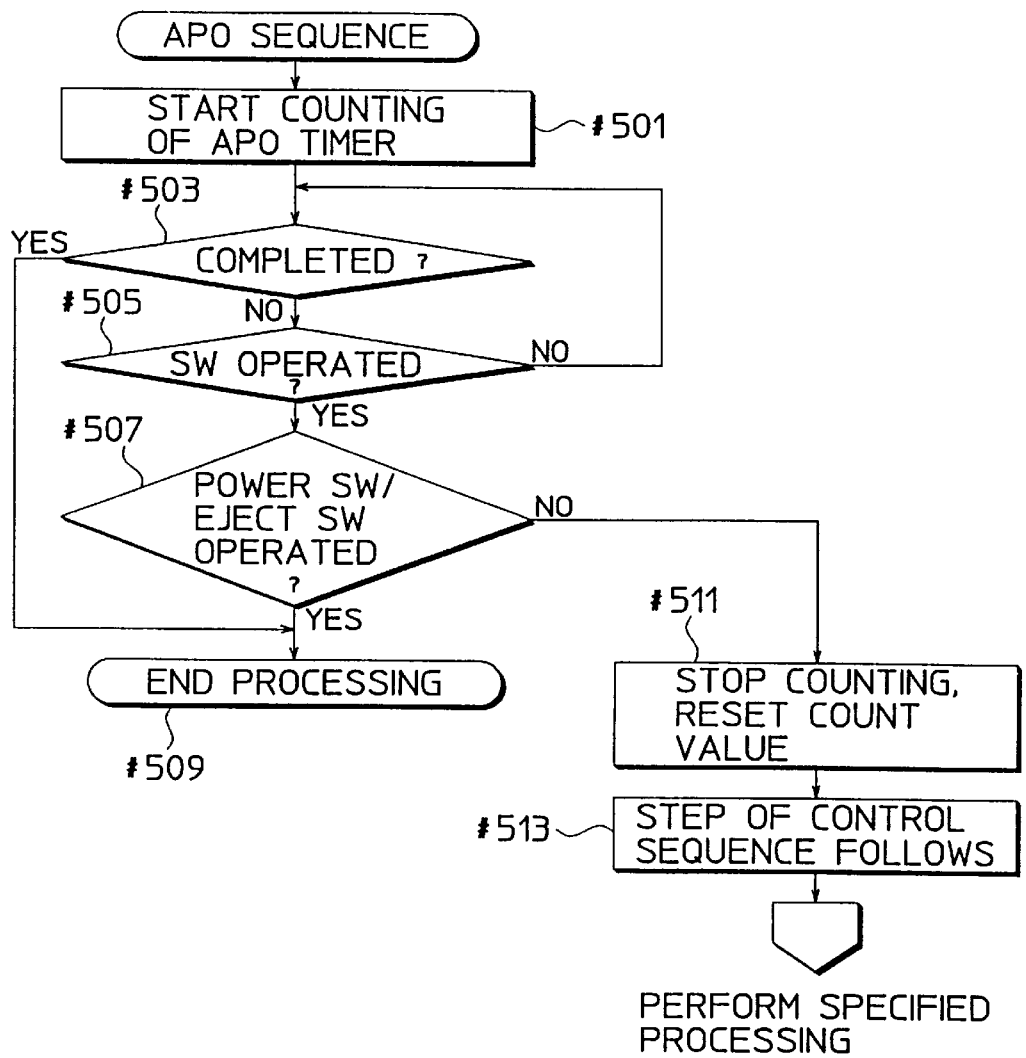
FIG. 12 is a flowchart showing a routine "APO Sequence"
Figure 13:
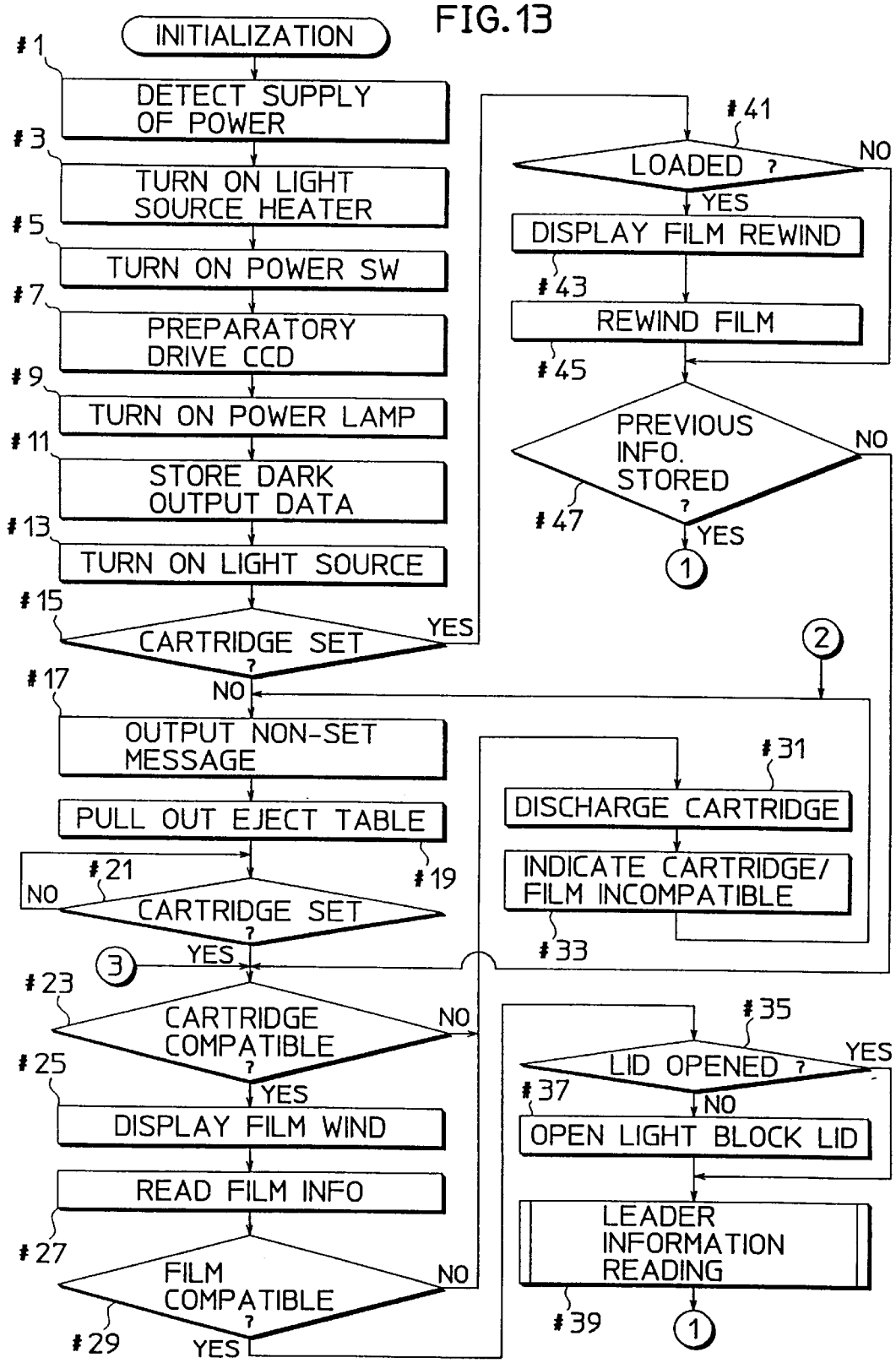
FIGS. 13 to 18 are flowcharts combinedly showing a routine "Initialization"
Figure 14:
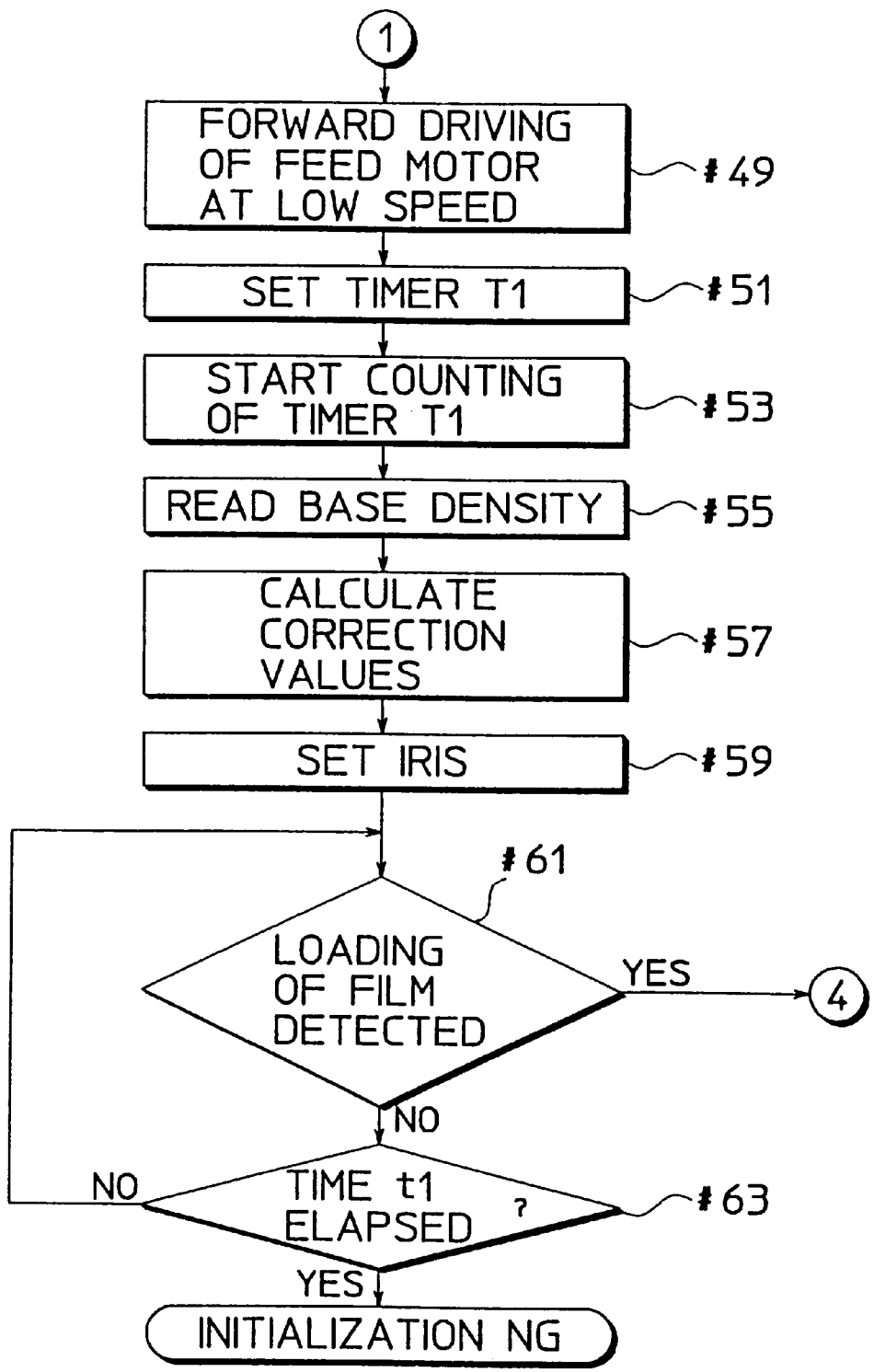

An APO (automatic power off) timer 44 is controlled in accordance with an "APO Sequence" shown in FIG. 12. This timer 44 operates so as to automatically turn the power switch 801 off when the reproduction has not been made for longer than a predetermined time.

The "APO Sequence" is implemented upon the completion of a specified processing in response to an instruction from the operation unit 8. First, the counting of the APO timer 44 is started to measure the predetermined time (Step #501). If the counting of the APO timer 44 is completed while none of the switches of the operation panel 101 is operated (YES in Step #503), a specified end processing is performed in accordance with an "End Sequence" to be described later (Step #509).

If some switch is operated during the counting of the APO timer 41 (YES in Step #505), it is discriminated whether either the power switch 801 or the eject switch 803 has been operated (Step #507). If either the power switch 801 or the eject switch 803 has been operated (YES in Step #507), the specified end processing is performed in Step #509. On the other hand, a switch other than the power switch 801 and the eject switch 803 has been operated (NO in Step #507), the counting of the APO switch 44 is stopped and a count value is reset (Step #511). Then, a step of a control sequence follows which corresponds to the instruction of the switch which has been operated so as to perform the specified processing.

Referring back to FIG. 4A, a power source (power generating means) 45 supplies specified levels of power to the respective circuits of the film image reproducing apparatus 1. The power source 45 includes a detector for detecting a supply of an alternating current. When a power plug K3 is plugged in an outlet and an alternating current is supplied, the power source 45 sends a detection signal to the controller 47. The controller 47 in turn recognizes that the power plug K3 was plugged in the outlet, performs a specified initialization, and enters a standby state.

The superimposition device 46 generates data to be superimposed on the image to be reproduced. Upon the receipt of the character information to be superimposed from the controller 47, the device 46 converts it into a superimposition data and outputs the obtained data to the second processor 30 at a specified timing.

The controller (power stopping means) 47 centrally controls the entire operation of the film image reproducing apparatus 1. The controller 47 controls the driving of the respective elements in accordance with a processing program which is stored in a built-in ROM (read only memory) in advance and is used to pick up and reproduce the film images.

Next, the reproducing operation of the inventive film image reproducing apparatus 1 is described with reference to flowcharts shown in FIGS. 13 to 34 and the drawings.

FIGS. 13 to 18 show the routine "Initialization" carried out when the power switch 801 of the film image reproducing apparatus 1 is turned on.

When the power plug K3 is plugged in the outlet and the alternating current is supplied, the supply of power is detected (Step #1) and the light source heater 194 is turned on (Step #3). When the operator turns the power switch 801 on (Step #5), the CCD 23 is preparatorily driven (Step #7) and the power lamp 802 is turned on (Step #9). The CCD 23 is preparatorily driven before the actual image pick-up operation to suppress the influence of level variation of a dark output which is produced before the start of the driving of the CCD 23.

If the monitor TV 2 is connected with the film image reproducing apparatus 1 and already activated, the color of the entire screen 3 of the monitor TV 2 is set, e.g. to blue and a display is made which indicates that the film image reproducing apparatus 1 was powered.

Subsequently, output signals of the respective pixels of the CCD 23 while the dark output is produced (hereinafter, referred to as "dark output data") are read as correction data for a dark output level of the pixel data representing the picked up image and are stored in the memory built in the AE/AWB calculating circuit 39 (Step #11). Thereafter, the light source 191 is caused to emit light (Step #13). Although the light source 191 automatically emits light after the completion of the operations in Steps #1 to #11, a light source switch (not shown) may be separately provided and the light source 191 may be caused to emit light when the operator turns the light source switch on.

It is then discriminated whether the film cartridge 9 is set in the film container 10 (Step #15). Unless the film cartridge 9 is set (NO in Step #15), a message indicating that the film cartridge 9 is not yet set is output (Step #17), the eject table 6 is pulled out of the film container 10 so that the film cartridge 9 can be set on the eject table 6 (Step #19), and this routine waits until the film cartridge 9 is set (Step #21).

Figure 28A:
FIGS. 28A to 28C are diagrams showing examples of symbol marks, FIG. 28B showing a rapid forward mark, and FIG. 28C showing a rewinding mark
Figure 28B:
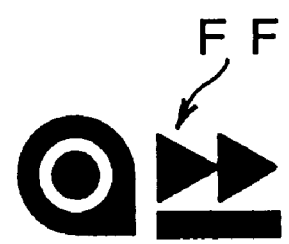
Figure 28C:
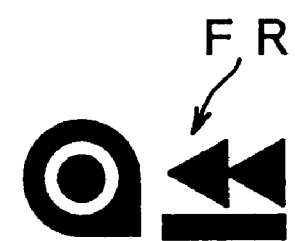

The above message is conveyed to the operator by blinking a film mark FM as shown in FIG. 28A in, for example, the display area 703 of the display unit 7 or the monitor TV 2, or by blinking another mark provided in the display area 703 to indicate that the film cartridge 9 is not set. Further, an audio message, e.g. "please insert a film cartridge" may be given via the loudspeakers 4 at the same time when the character message is displayed on the screen 3 of the monitor TV 2.

If the film cartridge 9 is set in the film container 10 (YES in Step #21), the compatibility of the film cartridge 9 and the film 11 (whether the reproduction can be properly performed) is discriminated (Step #23 and #29).

The compatibility of the film cartridge 9 is discriminated by checking, for example, whether it conforms to a cartridge standard, whether a developed film is contained therein (whether or not the indicator mark 93 of the film cartridge 9 points at "PROCESSED"), or whether the film cartridge 9 contains foreign matters.

If the film cartridge 9 is compatible (YES in Step #23), a display is made to indicate that the film is to be wound (Step #25), and the film information recorded in the bar code 94 of the film cartridge 9 is read (Step #27). Then, the compatibility of the film 11 is discriminated based on the film information (Step #29). The compatibility of the film 11 is checked with respect to the film sensitivity, the kink of film (negative/positive), the film standard, and the like.

If the film cartridge 9 or the film 11 are incompatible (NO in Step #23 or #29), the film cartridge 9 is discharged from the film container 10 (Step #31), and a message is displayed to indicate that the film cartridge 9 or the film 11 is incompatible (Step #33).

The incompatible message is displayed, for example, by blinking the film mark FM (see FIG. 28A) in the display area 703 of the display unit or on the monitor TV 2 at the same time an error code is displayed in the display areas 704 and 705. Alternatively, an incompatible mark separately provided in the display area 703 may be blinked. Further, an audio message "this cartridge cannot be used" may be given while the incompatible message is displayed on the screen 3 of the monitor TV 2.

If the film cartridge 9 and the film 11 are compatible (YES in Step #29), the light blocking lid 98 of the film cartridge 9 is opened (Steps #35 and #37) and the subroutine "Leader Information Reading" is carried out to read the leader information (Step #39). If the film image reproducing apparatus 1 is powered after being powered off while the film cartridge 9 is set, the film 11 is loaded and the leader information is read without opening the light blocking lid 98 since the lid 98 is already open (Steps #35 and #39).

If the film cartridge is already set when the film image reproducing apparatus 1 is powered (YES in Step #15), it is discriminated whether the film was already loaded, i.e. whether the film 11 was already pulled to the image recording portion 11B (Step #41). If the film 11 was already loaded (YES in Step #41), a film rewind display is made (Step #43), and the feed motor M is driven in the reverse direction (rewinding direction of the film 11) at high speed and the film 11 is rewound to the rear end position of the film leader 11A (until the perforation 113 is detected) (Step #45). The film rewind display is made by displaying the rewind mark FR shown in FIG. 28C on the display area 703 of the display unit 7 or on the monitor TV 2.

It is then discriminated whether the film information read from the film cartridge 9 during the previous loading of the film 11 is stored in the data memory 43 (Step #47). Unless the film information is stored in the data memory 43 (NO in Step #47), the operations in Steps 23 to 39 are carried out to read the film information. If the film information is already stored in the data memory 43 (YES in Step #47), this routine proceeds to Step #49 (see FIG. 14) without carrying out the operations in Steps 23 to 39 (without reading the film information).

Next, the reading of the leader information is described.

Figure 19:
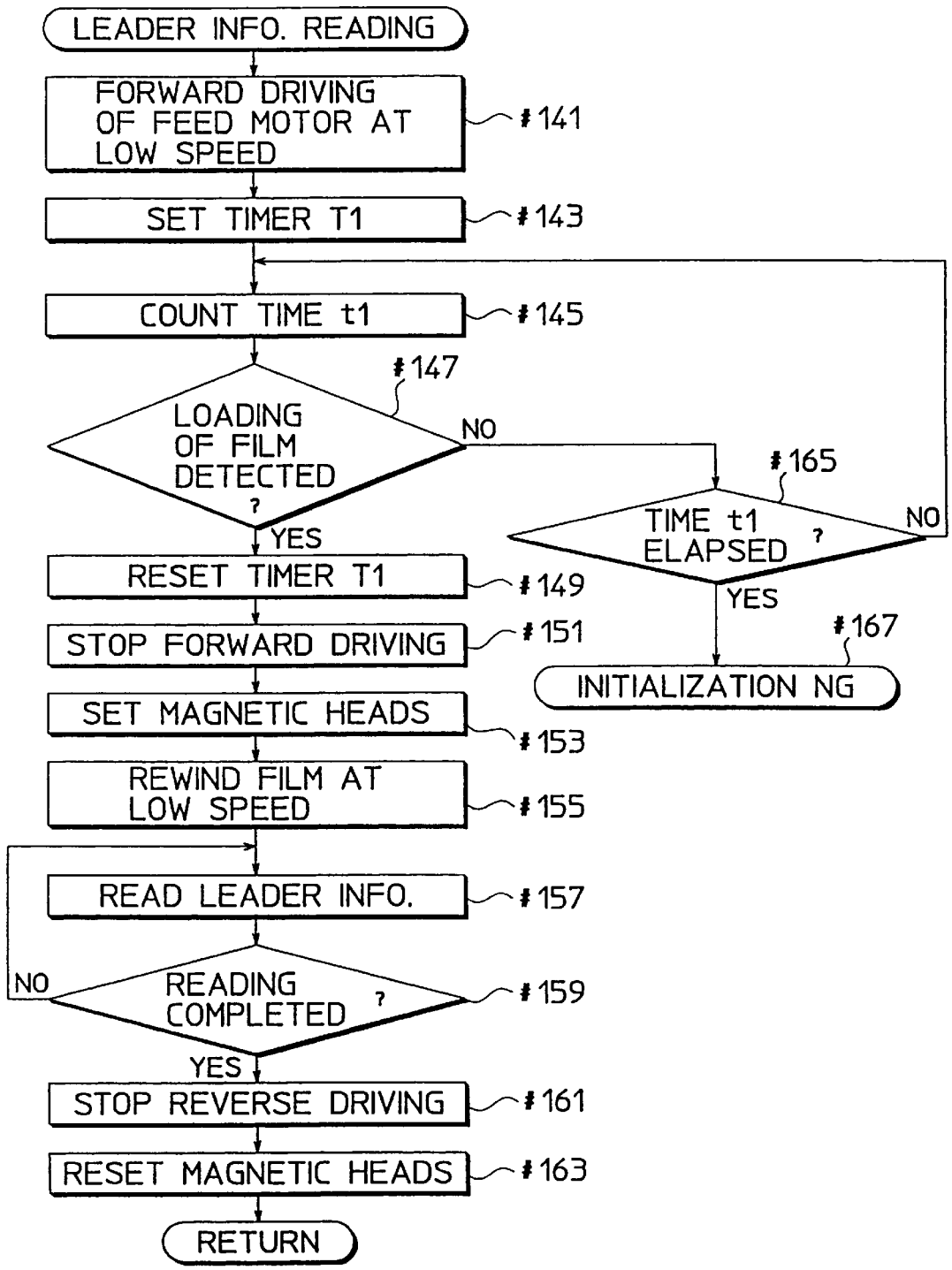
FIG. 19 is a flowchart showing a routine "Leader Information Reading"

FIG. 19 is a flowchart showing the subroutine "Leader Information Reading".

When the subroutine "Leader Information Reading" is called, the feed motor M is driven in the forward direction at low speed (the film 11 is wound at low speed) (Step #141), and the counting of the predetermined time t1 by the timer T1 provided in the controller 47 is started (Steps #143 and #145). The predetermined time t1 is counted by means of the timer T1 in order to discriminate whether the loading is completed within the predetermined time t1.

If the loading of the film 11 is detected by the loading detector 35 within the predetermined time t1 (YES in Step #147), the timer T1 is reset (Step #149), and the driving of the feed motor M is stopped (Step #151).

After the magnetic heads 18A and 18B are set in their reading positions (Step #153), the film 11 is rewound at low speed (Step #155), and the leader information stored in the magnetic recording portions 116A and 116B of the film leader 11A is read (Step #157).

More specifically, the leader information recorded in the magnetic recording portions 116A and 116B is read by the magnetic information read/write controller 33 while the film 11 is rewound at low speed until the perforation 111 indicating the front end position of the unexposed area (11E. The read leader information is stored in the data memory 43 via the controller 47. The reason why the leader information is read while the film 11 is rewound is that the film surface can be more easily straightened in comparison with the case where the leader information is read while the film 11 is wound, and therefore the information can be stably read.

Upon the completion of the reading of the leader information (YES in Step #159), the driving of the feed motor M is stopped (Step #161); the magnetic heads 18A and 18B are reset to their retracted positions (Step #163): and this subroutine returns.

If the loading of the film 11 is not detected by the loading detector 35 during the predetermined time t1 (NO in Step #165), an initialization failure processing is performed in accordance with a subroutine "Initialization NG" upon the judgment that the film 11 could not be loaded (Step #167).

Figure 20:
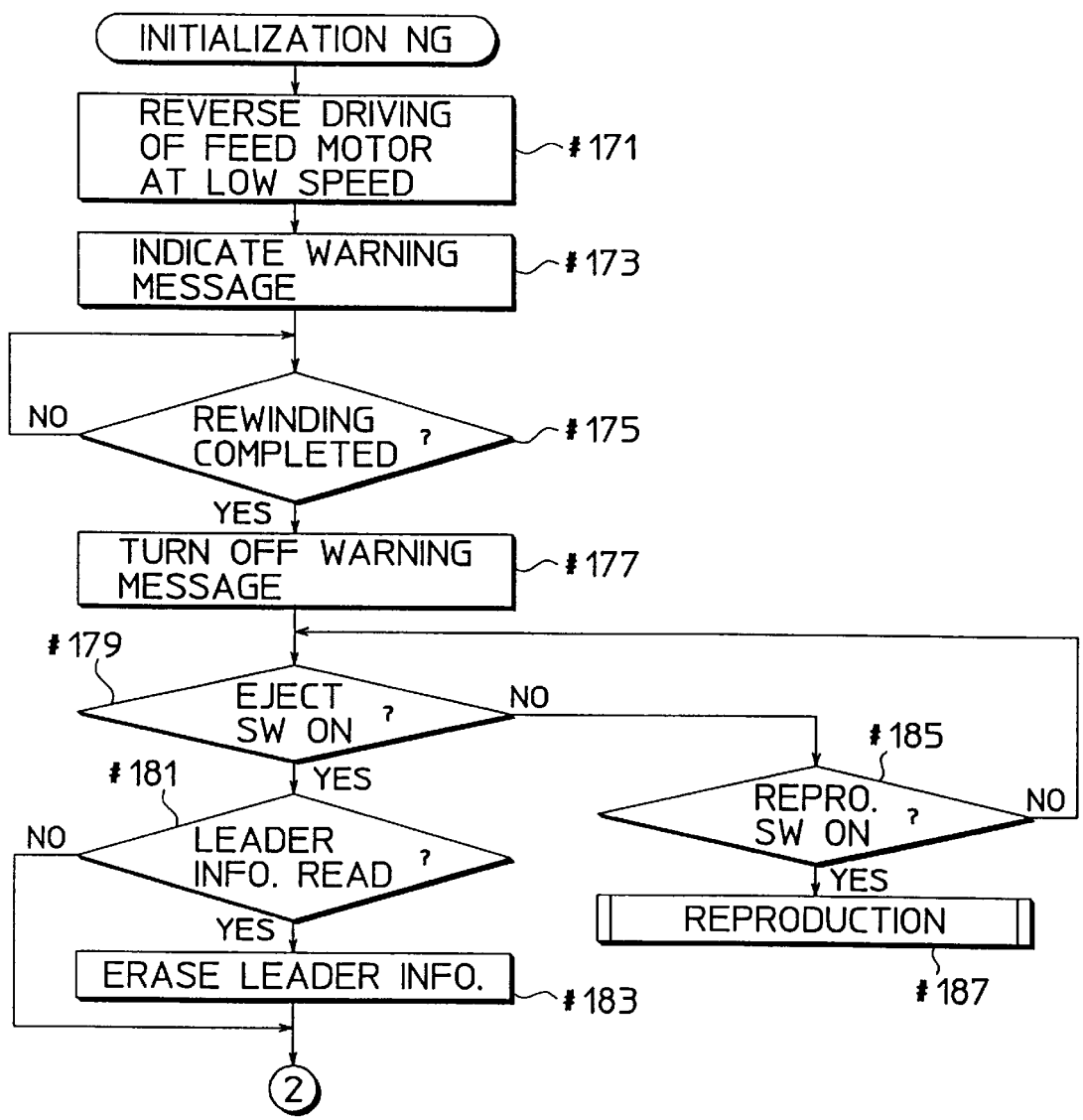
FIG. 20 is a flowchart showing a routine "Initialization NG"

FIG. 20 is a flowchart showing the subroutine "Initialization NG".

First, the film 11 is rewound into the film cartridge 9 at low speed, and a warning message indicating that there was an error in loading the film 11 is displayed in the display area 703 of the display unit 7 during the rewinding period (Steps #171 to #177). The warning message is given to the operator by, for example, blinking the film mark FM (see FIG. 28A) in the display area 703 of the display unit 7 of the film image reproducing apparatus 1.

It is then discriminated whether the operator instructed the discharge of the film cartridge 9 (i.e. the operator turned the eject switch 803 on) (Step #179) and it is further discriminated whether the operator instructed the reproduction (i.e. the operator turned the reproduction switch 816 on) (Step #185). If the reproduction was instructed (YES in Step #185), the film image(s) is/are reproduced as described later (Step #187).

On the other hand, if the operator instructed the discharge of the film cartridge 9 (YES in Step #179), it is further discriminated whether the leader information was already read (Step #181). If the leader information was already read (YES in Step #181) as in the case where there is an error in loading the film 11 after the leader information was read while the film 11 was rewound, the leader information stored in the data memory 43 is erased (Step #183), and Step #17 (see FIG. 13) follows. If the leader information was not yet read (NO in Step #181), Step #17 follows without erasing the leader information in the data memory 43.

The leader information stored in the data memory 43 is erased in Step #183 because there is a high possibility that the stored leader information is not used, and that the leader information is read from the set film cartridge 9 again after this subroutine returns to Step #17.

Referring back to FIG. 14, upon the completion of the reading of the leader information, the film 11 is loaded again (Steps #49 to #61), and the base density is read during this loading period (Step #55). In Step #57, correction values used for the signal processing of the picked up image are calculated based on the read base density, the read dark output data (Step #11) and the leader information (Step #39). Further, the iris 22 is set to have a predetermined aperture value (initial set value) (Step #59).

The corrections to be made during the signal processing for the picked up image include, for example, a correction of level of the light source in relation to the light amount, a shading correction, a correction of a sensitivity variation between the pixels, a color correction of the film base (a correction made by subtracting the base density from the density of the picked up image). The above level correction, the shading correction and the sensitivity variation correction are made during the signal processing in the analog processor 24. The AE/AWB calculating circuit 39 calculates the correction values for the respective corrections, and the calculation results are set in the analog processor 24.

The color correction of the film base is made during the signal conversion in the A/D converter 25. The AE/AWB calculating circuit 39 calculates a dynamic range of the A/D converter 25 in accordance with the base density, and the calculation result is set in the A/D converter 25.

If the film 11 is not loaded within the predetermined time t1 (YES in Step #63), the subroutine "Initialization NG" is carried out upon the judgment that there was an error in loading the film 11.

If the film 11 is properly loaded (YES in Step #61), the frame information recorded in the magnetic recording portions 117A and 117B of the film and the optical information 118 are read while the film 11 is wound at high speed, i.e., the feed motor M is driven in the forward direction at high speed until the last frame F comes out in Step #67 (see FIG. 15) (Steps #67 to #73). Subsequently, unexposed frames F are detected based on the read frame information, and information on the unexposed frames is stored in the data memory 43 as information on the frames which need not be reproduced (Step #75).

Subsequently, the base density is read in the film end 11C, and the light amount emitted from the light source is checked by comparing the base density with a predetermined reference base density (Steps #77 to #83). The check is made a plurality of times within a predetermined time t2 (a loop of Steps #77 to #83). In each check, if a difference between the base density and the reference base density (density difference) (=|the detected base density−the reference base density|) is larger than a specified value ε (YES in Step #81), a warning indicating the abnormality of the light source is made upon the judgment that the light source emits an abnormal amount of light (Step #85). Thereafter, an end processing is performed in accordance with a routine "End Sequence" shown in FIG. 24.

The light source abnormality warning is made by, for example, displaying an error code in the display areas 707 and 705 of the display unit 7 of the film image reproducing apparatus 1. Alternatively, this warning may be made by displaying a light source abnormality message on the monitor TV 2 and giving an audio message via the loudspeakers 4.

Figure 4B:
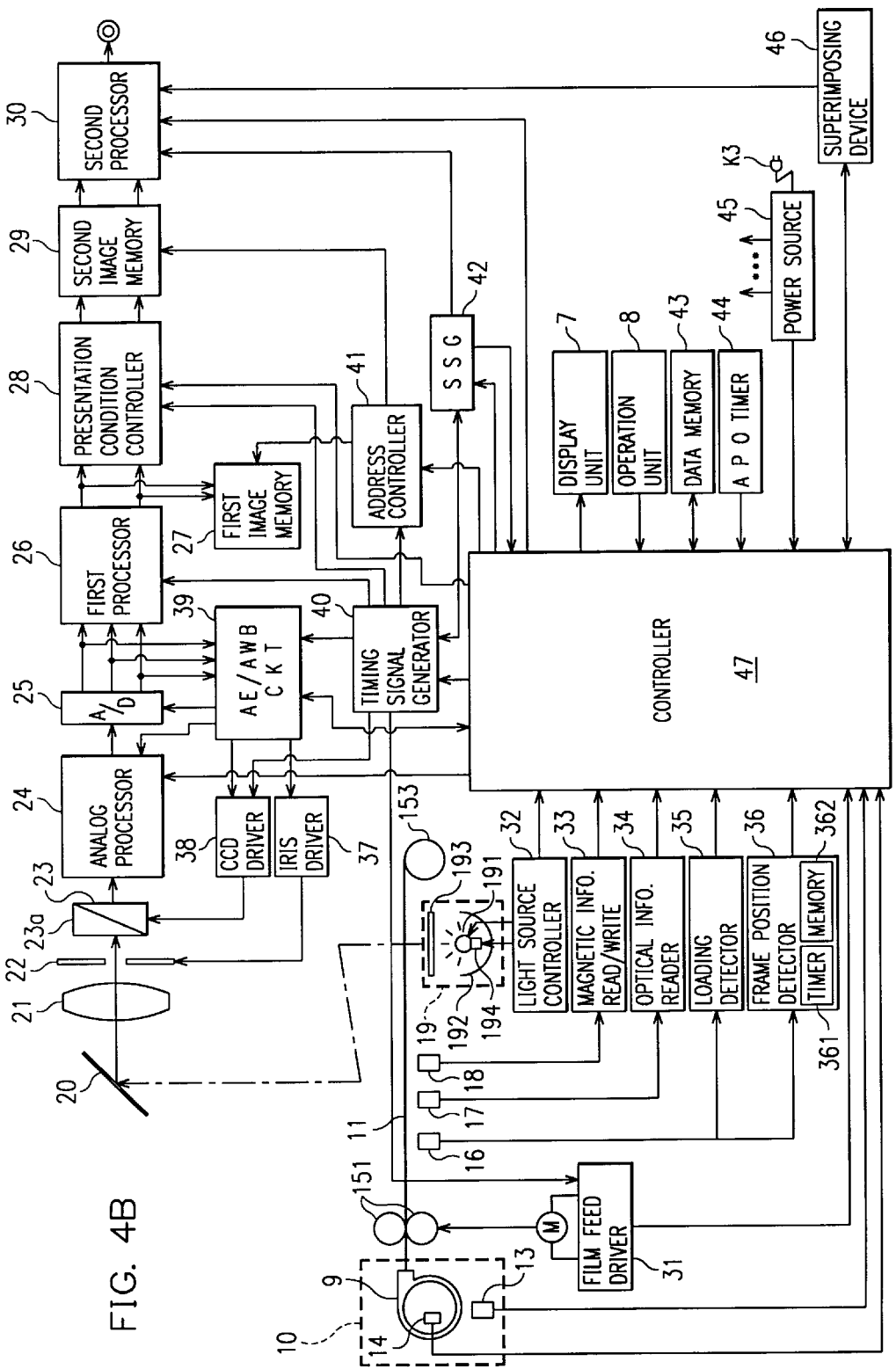

While the amount of light, or the nature of the light, emitted from the light source 191 is detected by CCD 23, one having ordinary skill in the art will appreciate that a separate device 23a (FIG. 4B) may be used to detect the amount of light and/or the nature of the light emitted from the light source 191.

Next, the end processing is described.

Upon entering the routine "End Sequence", a message "Power Off" is output (Step #321). This message may be made by, for example, displaying a video message representing the rewinding of the film 11 on the monitor TV 2, by giving an audio message "power will be turned off" from the loudspeakers 4, and/or by blinking the power lamp 802 of the film image reproducing apparatus 1.

Subsequently, the light source is turned off (Step #323), and the film 11 is fed at high speed to the last one of the frames F whose frame information needs to be rewritten (Step #325). While the film 11 is fed, a display indicating that the film 11 is being wound or rewound is made. This display is made by displaying the rewind mark FR or the rapid feed mark FF shown in FIGS. 28B and 28C in the display area 703 of the film image reproducing apparatus 1 or on the monitor TV 2.

The film 11 is then rewound at high speed, the frames F whose frame information needs to be rewritten are detected during the rewinding, and only the frame information is rewritten in the magnetic recording portions 117A and 117B of the detected frames F (Steps #327 to #333). Upon the completion of the rewriting of the frame information (YES in Step #333), the leader information is recorded in the magnetic recording portions 116A and 116B of the film leader 11A (Step #335). When the film 11 is completely contained in the film cartridge 9, the rewinding is stopped (Step #337).

Subsequently, the light blocking lid 98 of the film cartridge 9 is closed (Step #339), the indicator mark 93 is set to point at the specified position ("EXPOSED") (Step #341), and it is discriminated whether the end processing has been performed in response to the instruction made by means of the eject switch 803 (Step #343). The indicator mark 93 is set to point at "EXPOSED" so that, when the film cartridge 9 is set again after being discharged, no such discrimination is made that the film 11 is not a developed film and therefore the image recorded in the film 11 cannot be reproduced.

As disclosed in Japanese Unexamined Patent Publication No. 5-313234, the indicator mark 93 is set by stopping the driving of the spool 91 at the time when a signal pattern of the code corresponding to the used state of the film 11 is detected after the bar code 94 is detected by the photoreflector 14 during the rewinding of the film 11 and the film 11 is contained in the film cartridge 9.

Unless the end processing was instructed by means of the eject switch 803 (NO in Step #343), the processing is completed by turning the power switch 802 off (Step #345). On the other hand, if the end processing was instructed by means of the eject switch 803 (YES in Step #343), the film cartridge 9 is discharged from the film loader 12 (Step #347). During the discharge of the film cartridge 9, a message indicating thereof is displayed on the film image reproducing apparatus 1 and the monitor TV 2.

Subsequently, the APO timer 44 is started after being reset (Step #349). If the film cartridge 9 is newly set before the APO timer 44 finishes counting (YES in Step #353), the counting of the APO timer 44 is stopped and a count value is reset (Step #355). Then, this routine proceeds to Step #23 (see FIG. 13) to perform the initialization for the film cartridge 9. On the other hand, if the APO timer 44 finishes counting before the film cartridge 9 is newly set (NO in Step #353), the outlet 99 is closed (Step #352) and the routine proceeds to Step #345 to complete the processing by turning the power switch 802 off.

Referring back to FIG. 15, if the density difference (=|the detected base density−the reference base density|) is not larger than the predetermined value ε (NO in Step #81), the light emission amount of the light source is determined to be normal and it is discriminated whether there is a difference between the base density read to check the light source (see Step #77) and the base density read during the film loading (Step #55) in Step 87. If there is a difference (YES in Step #87), the correction values used for the processing of the image signals are calculated again based on the base density read to check the light source (Step #89). The correction values are calculated in the same manner as in Step #57. If there is no difference in the base density (NO in Step #87), the correction values are not calculated.

Figure 16:
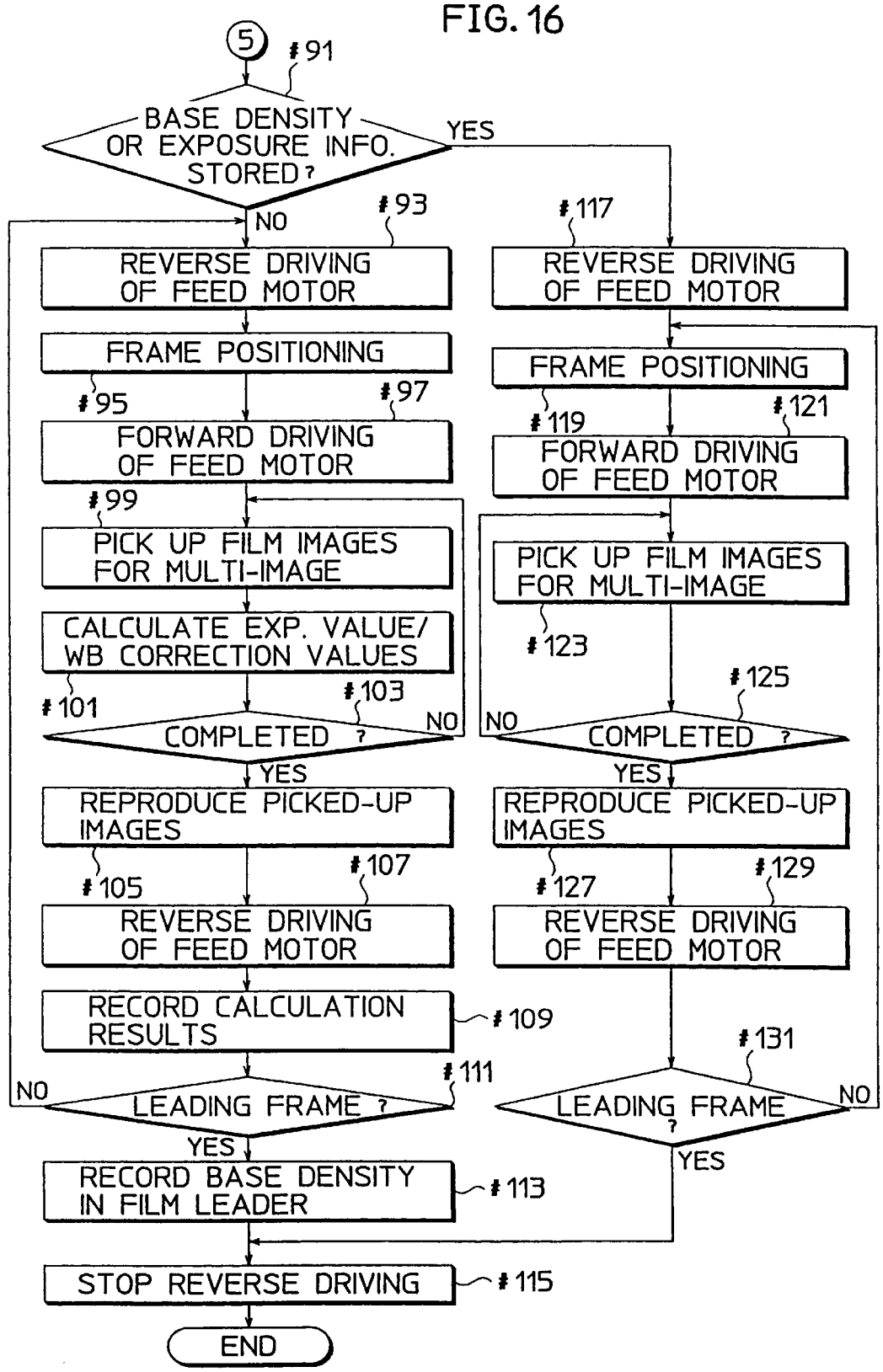

Subsequently, it is discriminated whether the base density or exposure information is stored in the data memory 43 (Step #91 in FIG. 16). Unless such information is stored (YES in Step #91), the film images of the respective frames F are picked up one after another from the last frame F to the leading frame F in the same way as to pick up the film images for the multi-image (i.e. the film images are picked up as reduced images) in the operations of Steps #93 to #111. The picked up images are reproduced one after another on the monitor TV 2 (Step #105), and the exposure value (shutter speed Tv) and the WB correction values (gains GR and GB of the amplifiers for read and blue signals) which are used to pick up the images during the main reproduction are calculated based on the picked up images (Step #101). The calculation results are recorded one after another in the magnetic recording portions 117A and 117B (Step #109).

Upon the completion of the recording of the exposure value and the WB correction value for the film image of the leading frame F (YES in Step #111), the base density and the other information are recorded in the magnetic recording portions 116A and 116B of the film leader 11A (Step #113). Then, the reverse driving of the feed motor M (the rewinding of the film 11) is stopped (Step #115), thereby completing the initialization.

The exposure value and the WB correction values are calculated in accordance with the following Equation (1), and the calculation results TV0, GR0 and GB0 are recorded on the film 11.

[Equation 1]

Exposure value (exposure period) Tv0=A/G0

Gain of the amplifier for the red signal GR0 G0/R0

Gain of the amplifier for the blue signal GB0 G0/B0 where

A: a constant,

G0: an average value of the green base density

B0: an average value of the blue base density

Every time the images are picked up from the respective frames, they are reproduced while being added to the currently reproduced multi-image.

Figure 29:
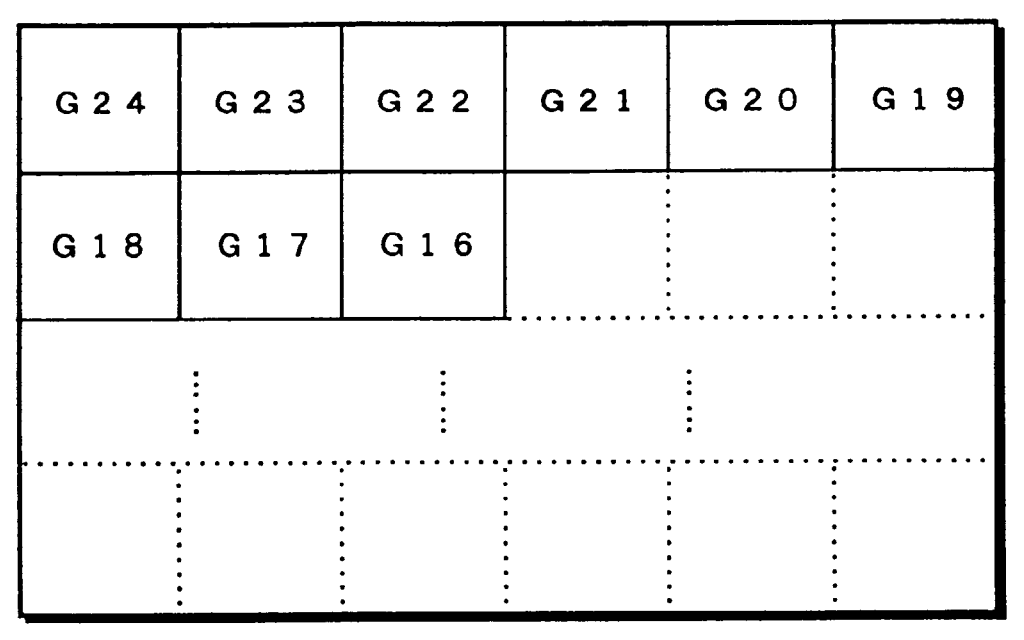

FIG. 29 is an example of the multi-image displayed on the monitor TV 2.

FIG. 29 shows an example in which 24 film images G1 to G24 are to be displayed in a (4×6) matrix pattern. Particularly, this example shows a multi-image including nine film images G24 to G16. Since the film images are picked up from the last frame F to the leading frame F, the respective film images G24 to G16 are arranged in positions (1, 1), (1, 2), . . . , (2, 3).

The tenth and subsequently film images G15, G14, . . . are reproduced on the monitor TV 2 while being successively arranged in positions (2, 4), (2, 5), . . . of the multi-image shown in FIG. 29, each time they are picked up. When the film image of the first frame F is picked up, the multi-image including 24 film images G24 to G1 arranged in the 4×6 matrix pattern is displayed on the monitor TV 2.

Referring back to FIG. 16, if the base density and the other information are already recorded (YES in Step #91), the film images of the respective frames F are picked up one after another from the last frame F to the leading frame F in the same way as to pick up the film images for the multi-image (i.e. the film images are picked up as reduced images) in the operations of Steps #117 to #131. The picked up images are reproduced one after another on the monitor TV 2 (Step #127). Since the exposure value and the WB correction values for the main reproduction are already recorded in this case, they are not calculated in the operations of Steps #117 to #131.

Upon the completion of the display of the film image of the first frame F (YES in Step #131), the reverse driving of the feed motor M (the rewinding of the film 11) is stopped (Step #115), thereby completing the initialization.

In this embodiment, after the completion of the loading of the film 11, the film 11 is fed to the film end 11C to read the film information, and the multi-image is displayed while picking up the film images of the respective frames F during the rewinding of the film 11 (see Steps #99, #105, #123 and #127). However, the film images of the respective frames F may be picked up at the same time the film information is read, and may be displayed in the form of a multi-image.

Figure 17:
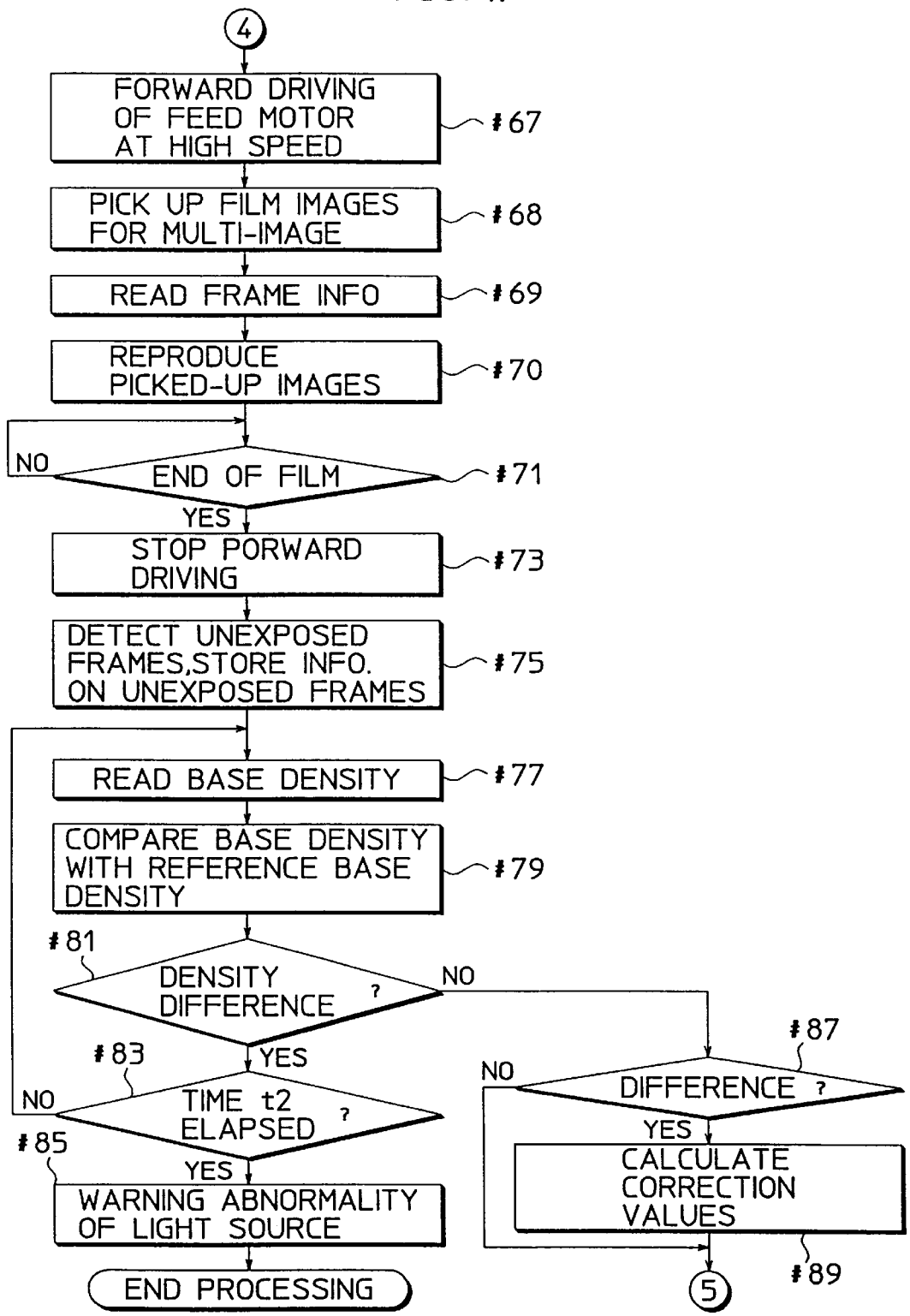
Figure 18:
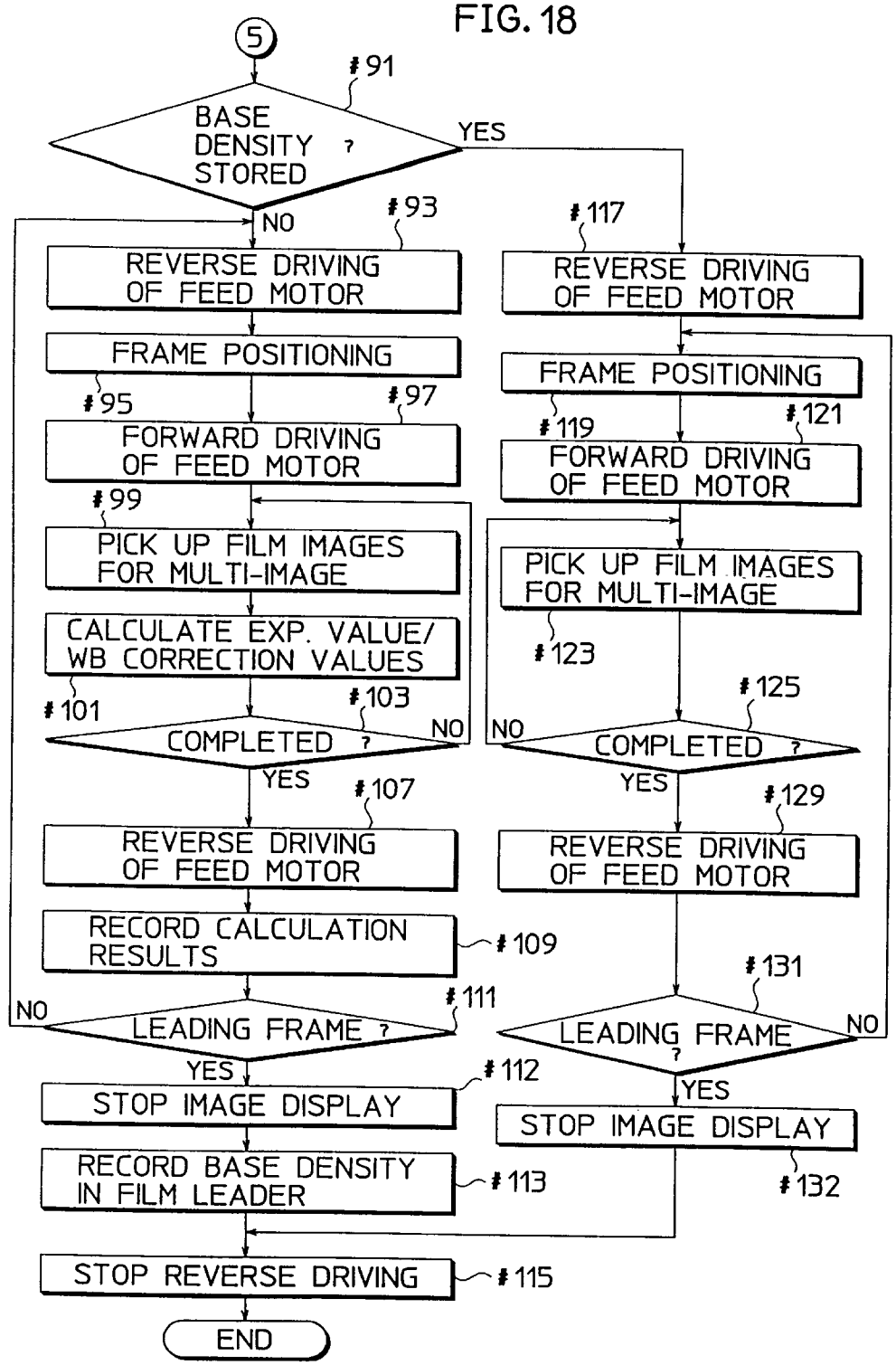

FIGS. 17 and 18 show a flowchart of the operations for displaying the film images of the respective frames F in the form of a multi-image while the film information is read.

Figure 15:
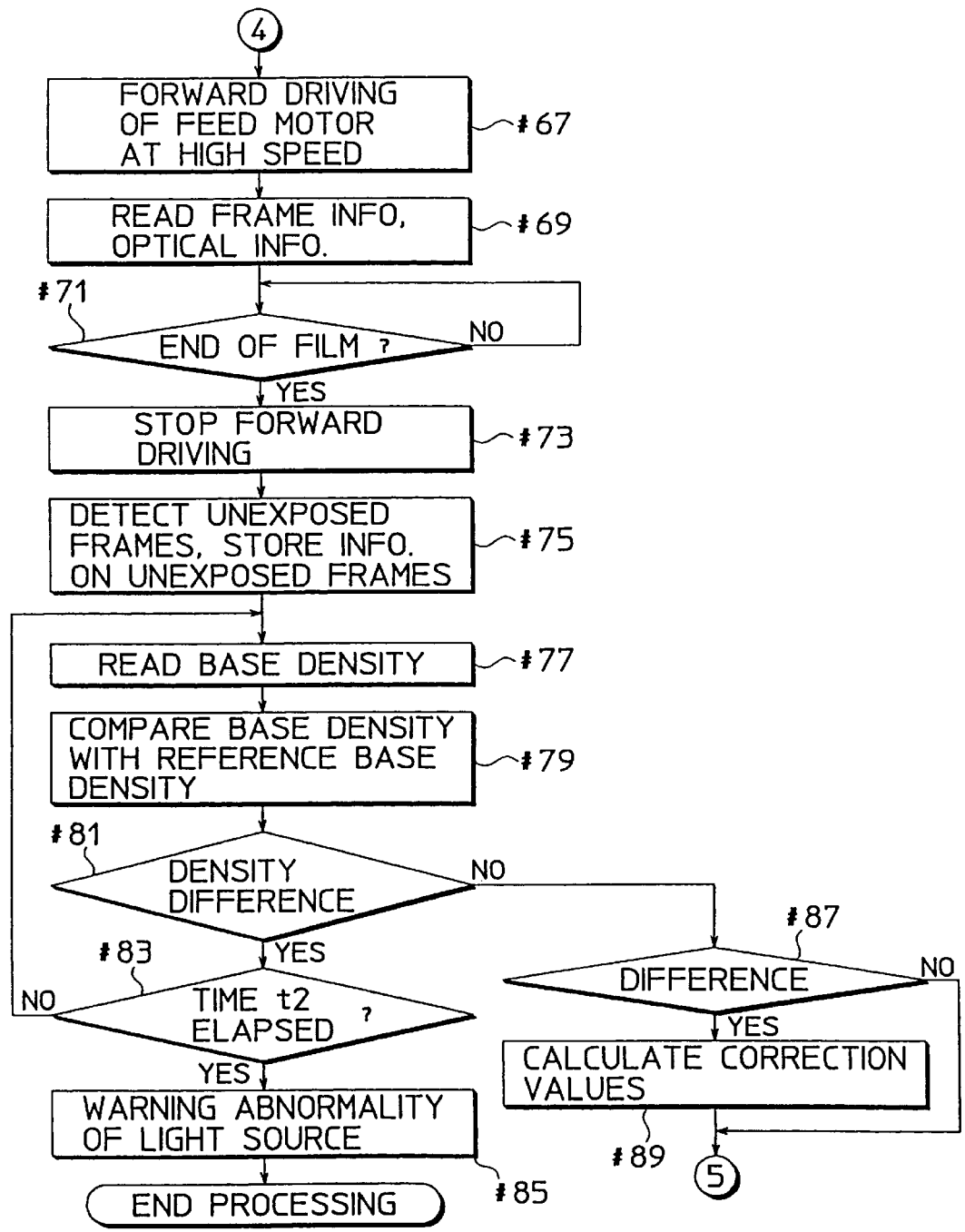

FIG. 17 differs from FIG. 15 in that an image processing for the multi-image (Step #68) is added between Steps #67 and #69 and an image display for combining the picked up images into a multi-image and displaying the same (Step #70) is added between Steps #69 and #71. FIG. 18 differs from FIG. 16 in that the image display steps (Steps #105 and #127) are deleted and the image display stop steps (Steps #112 and #132) are added between Steps #111 and #113 and right after Step #131. The deletion and the addition made in FIG. 18 is based on the addition of the image display step (Step #70) in FIG. 17.

According to the flowchart shown in FIGS. 17 and 18, after the completion of the loading of the film 11, the film 11 is wound to read the film information corresponding to the respective frames F, and the film image of the respective frames F are successively picked up in the same way as to pick up the film images for the multi-image, combined into a multi-image and displayed on the monitor TV 2 (Steps #68 to #71).

The multi-image in this case is displayed in the same way as the multi-image shown in FIG. 29. However, since the film images are picked up in the order reverse of the order in the case of FIG. 16, the arrangement order of the film images G1 to G24 is reverse of the one shown in FIG. 29.

When the film 11 is wound to the film end 11C and the film image of the last frame F is picked up (YES in Step #71), the multi-image including 24 film images G1 to G24 arranged in positions (1, 1), (1, 2), . . . (4, 5) and (4, 6) is displayed on the monitor TV 2. This multi-image is also displayed while the exposure value and the WB correction values corresponding to the respective frames F are calculated during the rewinding of the film 11. Upon the completion of the calculation (YES in Step #111 or #131), the display of the multi-image is stopped (Step #112 or #132).

In this embodiment, the multi-images are successively displayed on the screen 3 of the monitor TV while the film 11 is wound. Accordingly, the unpleasant feeling the user tends to have because no display is made on the monitor TV 2 for a certain time after the start of the initialization or the display contents are not changed will be reduced. Further, the film images contained in the multi-image are arranged in the order that they were photographed, the user will not feel a sense of incongruity toward the displayed multi-image.

In the flowchart shown in FIG. 17, each time a film image of each frame F is picked up, a new multi-image which is added with the picked up film image is successively displayed on the monitor TV 2. However, it may be appreciated to display multi-images for an averaged time during the film winding or the rewinding period. With this arrangement, since the multi-images displayed on the monitor TV 2 during the rewinding period of the film 11 (Steps #93 to #111 or #117 to #131) changes, the unpleasant feeling the user tends to have because the display contents on the monitor TV 2 do not change can be reduced.

Next, the reproduction of the film images is described with respect to a case where the film 11 includes 24 frames to be reproduced.

Figure 21:
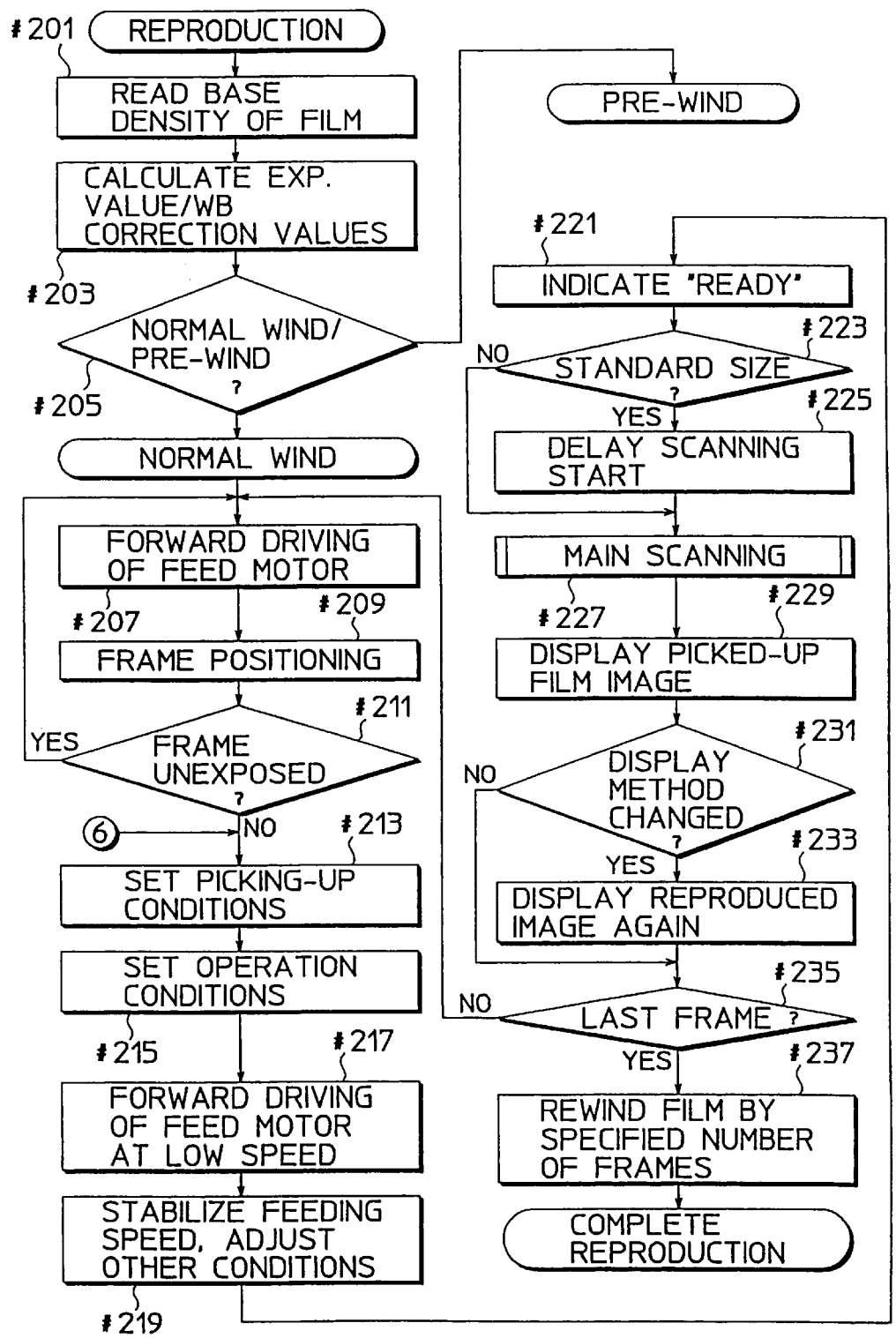
FIG. 21 is a flowchart showing a routine "Normal-Wind Film Reproduction"
Figure 22:
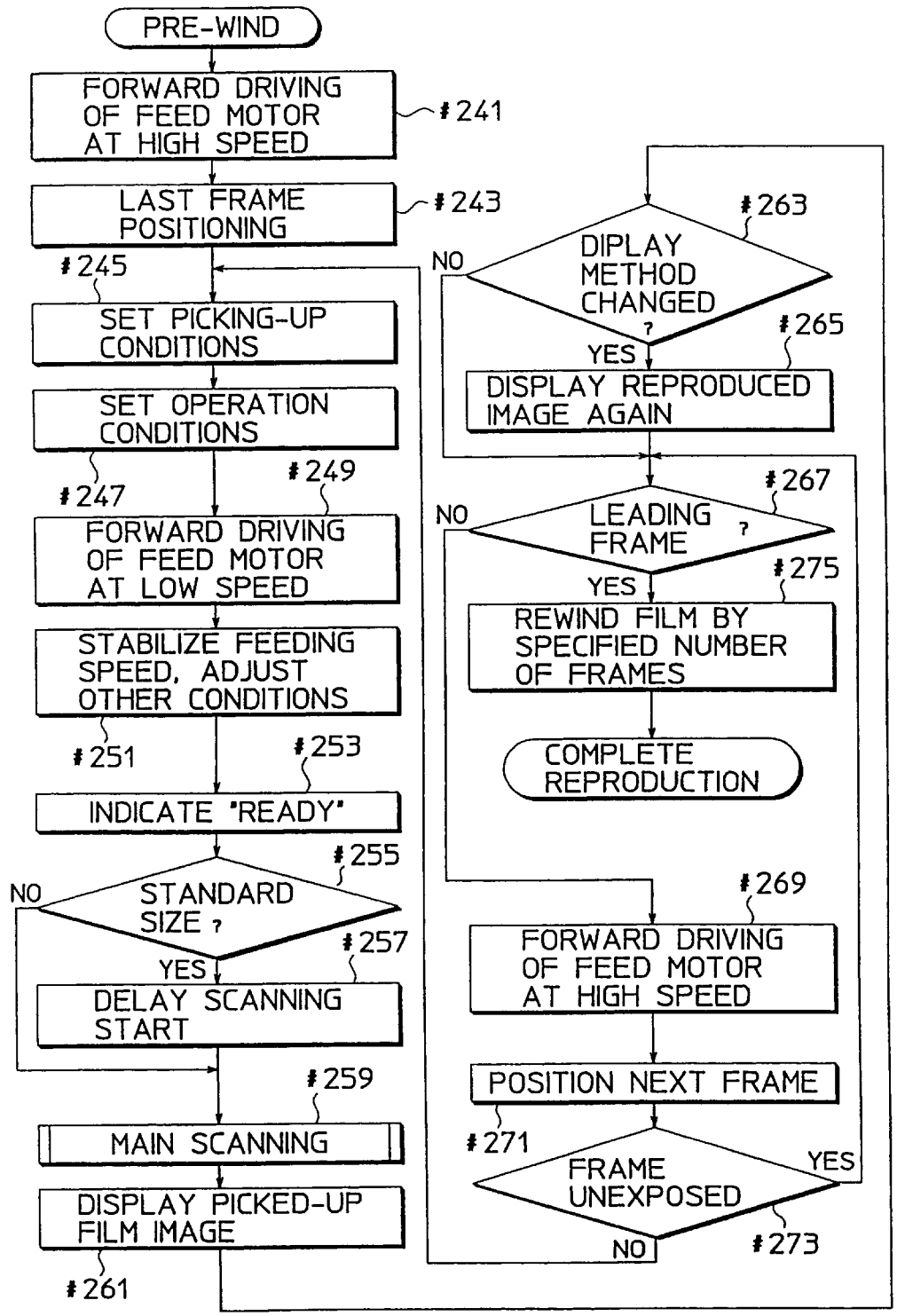
FIG. 22 is a flowchart showing a routine "Pre-Wind Film Reproduction"

FIGS. 21 and 22 are flowcharts showing a main routine "Reproduction".

First, the base density of the film 11 is read (Step #201). The base density is read by sensing the unexposed area between the frames, above or below the frames. Subsequently, the exposure value and the WB correction values for each frame F are calculated based on the base density and the exposure value and the WB correction values calculated during the initialization (see Steps #101 and #109 in FIG. 16) (Step #203).

Assuming that r1, g1, b1 denote the base densities of the respective colors R, G, B which were read in Step #201, and that r0, g0, b0 denote the base densities of the respective colors R, G, B which were read during the initialization (see Step #55 in FIG. 14), the exposure value Tv and the WB correction values (WB gains GR1, GB1 of the amplifiers for the red and blue signals) are calculated in accordance with the following Equation (2).

[Equation 2]

$$Tv1 = Tv0 \cdot (g0/g1)$$

$$GR1 = GR0 \cdot (g0/g1) \cdot (r0/r1)$$

$$GB1 = GB0 \cdot (g0/g1) \cdot (b0/b1).$$

In the case where the exposure value Tv0 and the WB correction values GR0, GB0 calculated during the previous reproduction are recorded in the magnetic recording portions 116A, 116B, 117A and 117B of the film 11, the exposure value Tv1 and the WB correction values GR1, GB1 suitable for picking up the film images to be reproduced are calculated based on the exposure value Tv0 and the WB correction values GR0, GB0 read from the film 11 and the base densities r1, g1, b1 in accordance with the Equation (2).

Next, the type of the film 11 is discriminated (Step #205).

There are two kinds of photographing methods: a normal wind method and a pre-wind method. According to the normal wind method, each time the photographing is performed, the film is wound by one frame, so that the images are successively recorded on the film from the leading frame to the last frame. According to the pre-wind method, the film is wound to the last frame position upon being loaded, and it is rewound by one frame each time the photographing is performed, so that the images are successively recorded on the film from the last frame to the leading frame.

Figure 30:
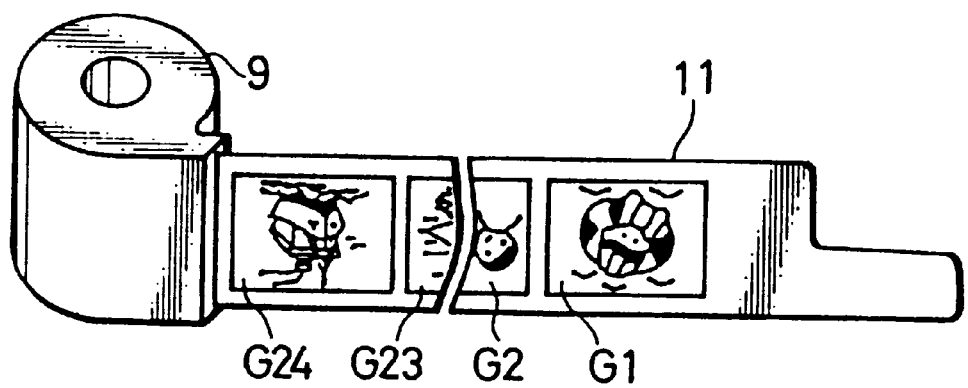
FIG. 30 is a perspective view showing an arrangement of frames of a normal-wind film.
Figure 31:
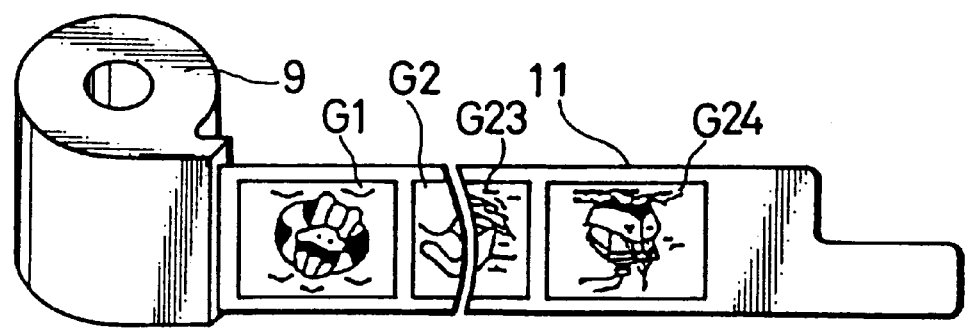
FIG. 31 is a perspective view showing an arrangement of frames of a pre-wind film.

As shown in FIG. 30, in the film exposed according to the normal wind method (hereinafter, referred to as "normal wind film"), the oldest film image G1 is recorded in the leading frame F of the film 11 and the latest film image G24 is recorded in the last frame F. As shown in FIG. 31, in the film exposed according to the pre-wind method (hereinafter, referred to as "pre-wind film"), the latest film image G24 is recorded in the leading frame F of the film 11 and the oldest film image G1 is recorded in the last frame F.

The type of the film 11 is discriminated based on the magnetic information read from the film 11 by the controller 47. For example, if the information concerning the type of the film is directly recorded on the magnetic recording portions 116A and 116B of the film leader 11A, the type of the film 11 is discriminated based on this magnetic information. On the other hand, if the information concerning the type of the film is not directly recorded, the type of the film 11 is discriminated based on the dates of photographing recorded on the magnetic recording portions 117A and 117B in correspondence with the respective frames F.

If the film 11 is of the normal wind type, it is wound to the starting position where the film image of the first frame F to be reproduced (the first exposed frame F) is picked up (i.e. to the detection position of the perforation 111 indicating the front end position of this frame F) (a loop of Steps #207 to #211). Then, the picking-up conditions for this film image are set (Step #213).

The picking-up conditions include, for example, the exposure level, the WB correction values, the γ-correction value, the frame conversion condition, the trimming condition, the resolution information and the magnification of the optical system. In Step #213, the picking-up conditions which are not yet set are set.

Subsequently, the operation conditions of the respective devices and processors are set (Step #215). For example, the light emission amount of the light source 191, the aperture value of the iris 22, the exposure period of the CCD 23 (shutter speed Tv), the WB gains of the analog processors 24 are set.

Then, the low speed feeding of the film 11 is started to pick up the film images to be reproduced (Step #217). When the film images are reproduced with the high vision aspect ratio, the scanning is started at a timing when the front end position of the image reaches the image pick-up position of the CCD 23, and is completed at a timing when the rear end position of the image passes the image pick-up position.

Between the feed start timing of the film 11 and the scanning start timing of the film image, there is a time lag to stabilize the feeding speed and adjust the other conditions. During the time lag, a character message "READY" indicating that the scanning is being prepared is displayed on the monitor TV 2 (Steps #219 and #221).

The scanning start timing is measured by detecting a specified lapse of time from the feed start timing of the film 11, by detecting the perforation 111 indicating the front end position of the film image, or by detecting a specified fed distance of the film 11. The scanning may be started at a timing when the feeding speed of the film 11 reaches a specified low speed.

During the preparation for the scanning, it is discriminated based on the format information whether the image to be reproduced is of the standard size (Step #223). If the image is of the standard size (YES in Step #223), the scanning start timing is delayed by a predetermined time Td (Step #225).

In the case of the standard size, the scanning start timing is delayed because the image GL to be reproduced falls within an area obtained by deleting the opposite lateral end d1 of the film image as shown in FIG. 9B. Accordingly, if v denotes the feeding speed of the film 11, the scanning start timing is delayed by d1/v from the normal scanning timing when the image to be reproduced is of the standard size.

Figure 23:
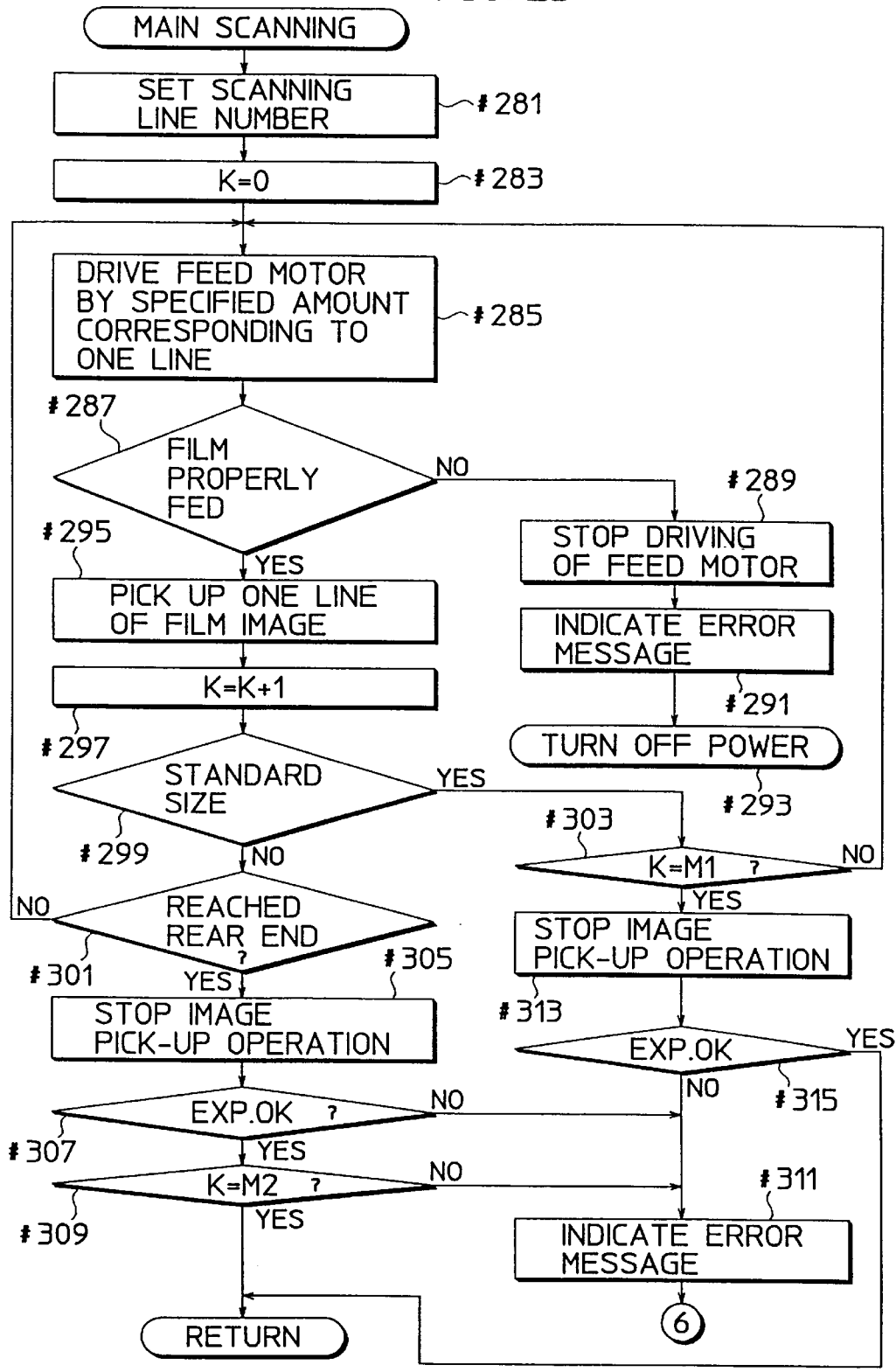
FIG. 23 is a flowchart showing a routine "Main Scanning"
Figure 24:
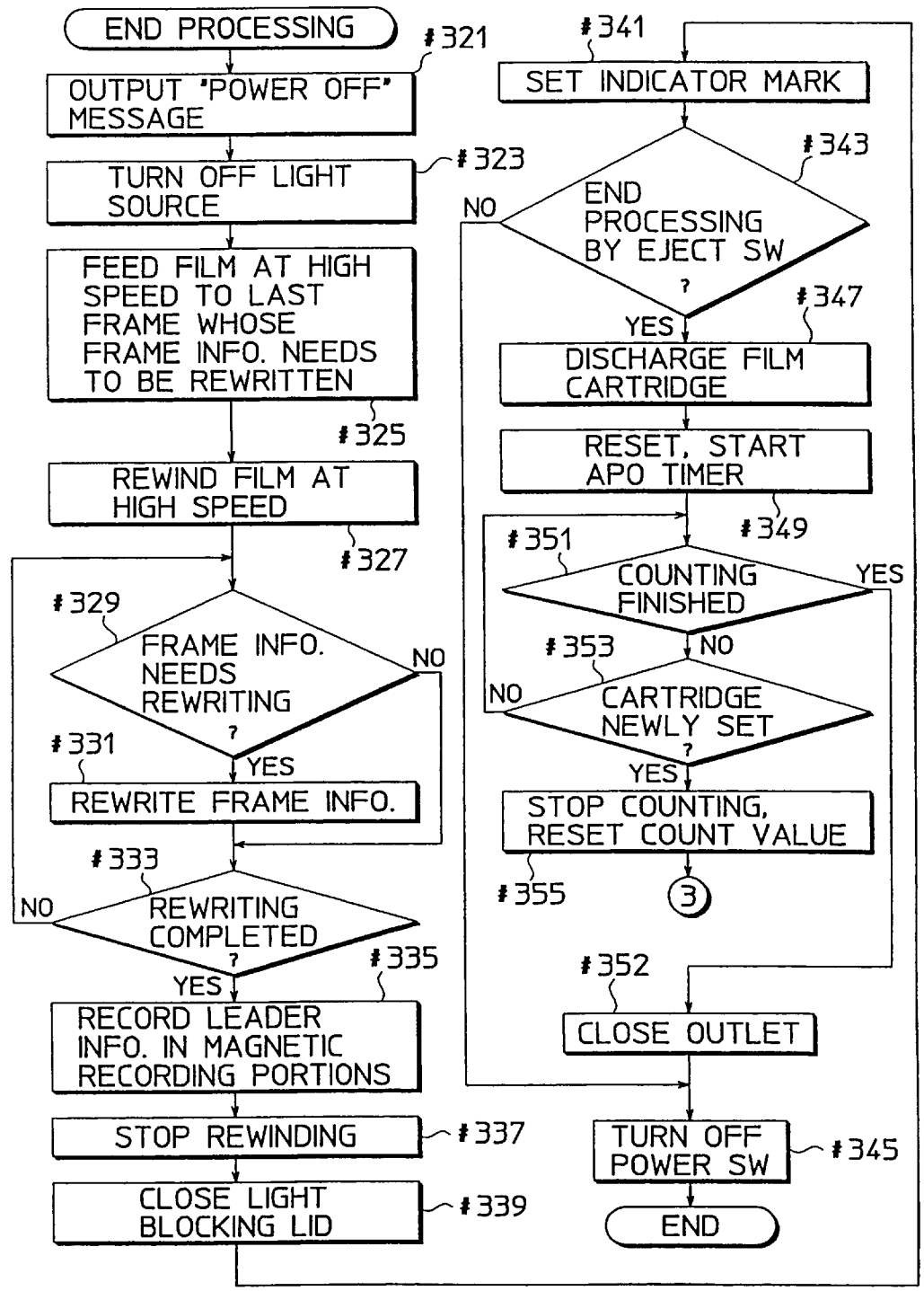
FIG. 24 is a flowchart showing a routine "End Processing"

Subsequently, the film images are picked up in accordance with a subroutine "Main Scanning" shown in FIG. 23.

When the subroutine "Main Scanning" is called, a scanning line number Mn is set (Step #281), and a count value of a counter K for counting the number of the actually read lines is reset to "0" (Step #283). The scanning line number Mn is a specified line number corresponding to the reproduction size of the image. If the reproduction size is of the standard size, an intermediate area excluding the opposite lateral ends of the film image is scanned (see FIG. 9B). The line number M1 corresponding to this specified area is set as a scanning line number. If the reproduction size is not of the standard size, the entire film image is scanned with respect to the scanning direction (see FIGS. 9A and 9C). Accordingly, a line number M2 corresponding to the entire area of the film image is set as a scanning line number.

Subsequently, the feed motor M is driven at a specified speed to feed the film 11, and the film image of the frame F is scanned (a loop of Steps #285 to #303). The film image is picked up by the line each time the film 11 is fed by one line (Step #295). The image pick-up by the line is repeatedly performed until the rear end position of the image pick-up area is detected (YES in Step #301 or #303).

In the main scanning, it is discriminated whether the film 11 is properly fed so that the film image is properly picked up. In other words, each time the feed motor M is driven by a specified amount corresponding to one line (Step #285), it is discriminated whether the film 11 is properly fed by one line by the driving of the feed motor M (Step #287).

The above discrimination is made, for example, by monitoring a drive current value and a load torque of the feed motor M, or by checking a feed failure of the film 11 (i.e. whether the film 11 is cut, caught, slid, or the like). If the film 11 has been properly fed (YES in Step #287), one line of the film image is picked up (Step #295). Unless the film 11 has been properly fed (YES in Step #287), the driving of the feed motor M is immediately stopped (Step #289). After an error message indicating an abnormality in feeding the film is displayed in the display unit 7 of the film image reproducing apparatus 1 (Step #291), a process is performed to turn the power off (Step #293). Specifically, this process is to stop the on-going processing, turn the power switch 801 off, and enter a standby state until the error content is dealt with.

If the film 11 is fed until the rear end position of the image pick-up area of the film image reaches the image pick-up position when the reproduction size is not of the standard size (YES in Step #301), the image pick-up operation is stopped (Step #305). Then, it is discriminated whether the exposure and the image pick-up area for the picked up image are proper (Steps #307 and #309). If the discrimination result is in the negative either in Step #307 or in Step #309, an error message indicating an abnormality in scanning the film image is displayed on the display unit 7 of the film image reproducing apparatus 1 (Step #311), and this subroutine returns to Step #213 to scan the film image of the corresponding frame F again. If the discrimination result is in the affirmative in Steps #307 and #309, this subroutine returns.

When the reproduction size is of the standard size, upon the completion of the scanning of the film image by the specified line number M1 (YES in Step #303), the image pick-up operation is stopped (Step #313). Then, it is discriminated whether the exposure for the picked up image is proper (Step #315). If the exposure for the picked up image is not proper (NO in Step #315), the error message indicating an abnormality in scanning the film image is displayed on the display unit 7 of the film image reproducing apparatus 1 (Step #311), and this subroutine returns to Step #213 to scan the film image of the corresponding frame F again. If the exposure for the picked up image is proper (YES in Step #315), this subroutine returns.

Referring back to FIG. 21, upon the completion of the image pick-up operation of the film image, the picked up film image is reproduced and displayed on the monitor TV 2 in accordance with the set presentation conditions (Step #229). It is then discriminated whether any instruction has been made to change a method of displaying the reproduced image (Step #231). If any instruction has been made (YES in Step #231), the display method is changed based on the changed contents and the reproduced image is displayed again (Step #233). On the other hand, if no instruction has been made (NO in Step #231), the current reproduction and display are continued.

It is then discriminated whether the reproduced image is the film image G24 corresponding to the last frame F (Step #235). If the reproduced image is not the film image G24 (NO in Step #235), this routine returns to Step #207 to reproduce the film image of the next frame F. The film images are reproduced from the first film image G1. Upon reproducing the last film image G24 (YES in Step #235), the reproduction is completed after the film 11 is rewound by a specified number of frames (Step #237).

The film 11 is rewound in Step #237 to feed the film 11 to a specified position so that the frames F to be reproduced can be rapidly searched upon a next instruction of the reproduction. The specified position may be a scanning position of the leading frame, the last frame or the center frame. The specified position may be set at the scanning position of the leading frame in the case where the film images are frequently reproduced from the film image G1 of the leading frame F. However, assuming that the first one of the frames F to be reproduced is normally randomly selected, the specified position may be set in the scanning position of the center frame to minimize an average time to access the first frame F.

If the film 11 is of the pre-wind type in Step #205, this routine proceeds to Step #241 (see FIG. 22), and operations of Steps #241 to #275 are performed to reproduce the film images of the respective frames F in the same manner as in the case of the normal wind film.

Since the images are recorded in the frames F from the last frame to the leading frame in the pre-wind film, the film 11 is fed at high speed to the scanning position of the last frame at its rear end (or the first frame F to be reproduced) (Step #241). The film images G1, G2, . . . , G24 of the frames F are successively reproduced while the film 11 is fed to its leading end (Steps #241 to #275). Upon reproducing the film image of the leading frame F (the frame F in which the last film image G24 is recorded) (YES in Step #267), the reproduction is completed after the film 11 is rewound by a specified number of frames (Step #275).

In the main scanning of each frame F, upon setting the film image in the scanning position, whether or not the film image of the frame F is to be reproduced is discriminated by detecting whether or not this frame F is unexposed. In the case of the pre-wind film, there is little possibility that the last frame F (the frame in which the first film image G1 is recorded) is unexposed. Accordingly, the discrimination as to whether or not the frame is unexposed is made from the second frame F (the frame in which the film image G2 is recorded).

More specifically, in the reproduction of the normal wind film shown in FIG. 21, the discrimination as to whether or not the frame is unexposed is made (Step #211) after the frame whose film image is to be picked up is positioned (Step #209) so that the above discrimination can be made after the scanning position of the leading frame F (the frame in which the film image G1 is recorded) is set. However, in the reproduction of the pre-wind film shown in FIG. 22, instead of providing the discrimination step after the last frame F is positioned (Step #243), the discrimination step (Step #273) is provided after the next frame is positioned (Step #271).

Figure 32A:
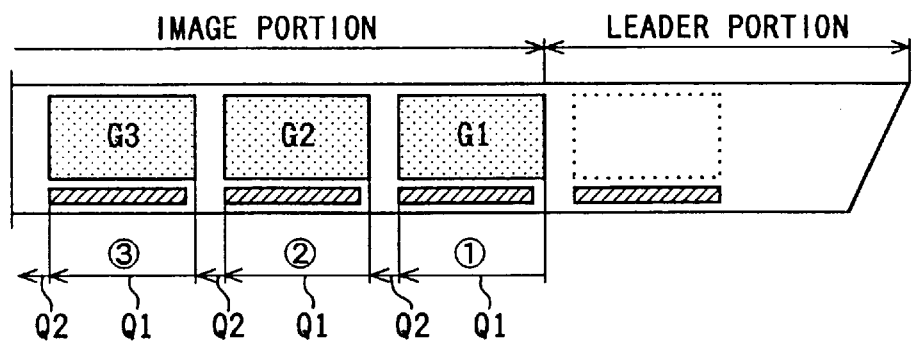
FIGS. 32A and 32B show a feed control for the film during the reproduction, FIG. 32A showing a feed control for the normal-wind film and FIG. 32B showing a feed control for the pre-wind film.
Figure 32B:
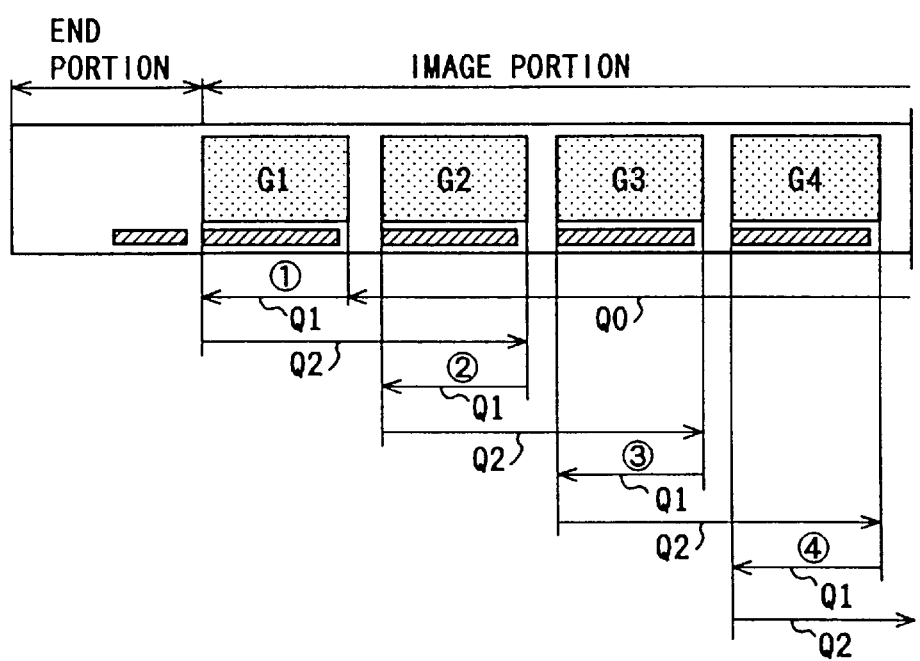

FIGS. 32A and 32B show a feed control for the film during the reproduction, FIG. 32A showing a feed control for the normal wind film and FIG. 32B showing a feed control for the pre-wind film.

In FIGS. 32A and 32B, thin arrows Q1 denote a scanning direction in which the film image is scanned in the main scanning; bolt arrows Q0 denote a feed of the film 11 from the leading frame to the last frame; and arrows Q2 denote a feed of the film 11 between frames. Numerals enclosed in circle which are assigned to the respective arrows Q1 and Q2 denote the order of the main scanning (the order in which the film images are picked up). The feeds of the film 11 represented by the arrows Q0 and Q2 are made to search the scanning position of each frame F. Accordingly, these feeds are made at a speed higher than the feed Q1 during the main scanning.

In the case of the normal wind film, the film images G1, G2, . . . , G24 are successively picked up and displayed on the monitor TV 2 while the film 11 is being wound. Accordingly, the film 11 is simply fed in the winding direction as shown in FIG. 32A.

On the other hand, in the case of the pre-wind film, the film images G1, G2, . . . are arranged from the film end 11C to the film leader 11A. Accordingly, upon the start of the reproduction, the film 11 is wound to the scanning position of the film image G1 at high speed. Thereafter, the main scanning is performed in the winding direction of the film 11 to scan the film image G1, and the scanned film image G1 is reproduced and displayed. Upon the completion of the reproduction of the film image G1, the film 11 is rewound to the scanning position of the film image G2 at high speed, and the feeding direction of the film 11 is reversed. The main scanning is performed in the winding direction of the film 11 to scan the film image G2, and the scanned film image G2 is reproduced and displayed.

Hereafter, the high speed feed in the rewinding direction to set the scanning position of the film image and the low speed feed in the winding direction to perform the main scanning are repeated to pick up, reproduce and display the film images G3, G4, . . . , G24. In other words, in the case of the pre-wind film, the film 11 is fed in the rewinding direction while making a reciprocating movement.

The above reproduction is for the case where the frames F including the recorded images are reproduced in a specified reproduction order. However, there are some case where the operator desires to retrieve the photographed contents of the film 11 and to selectively reproduce and display the desired frames F.

Figure 25:
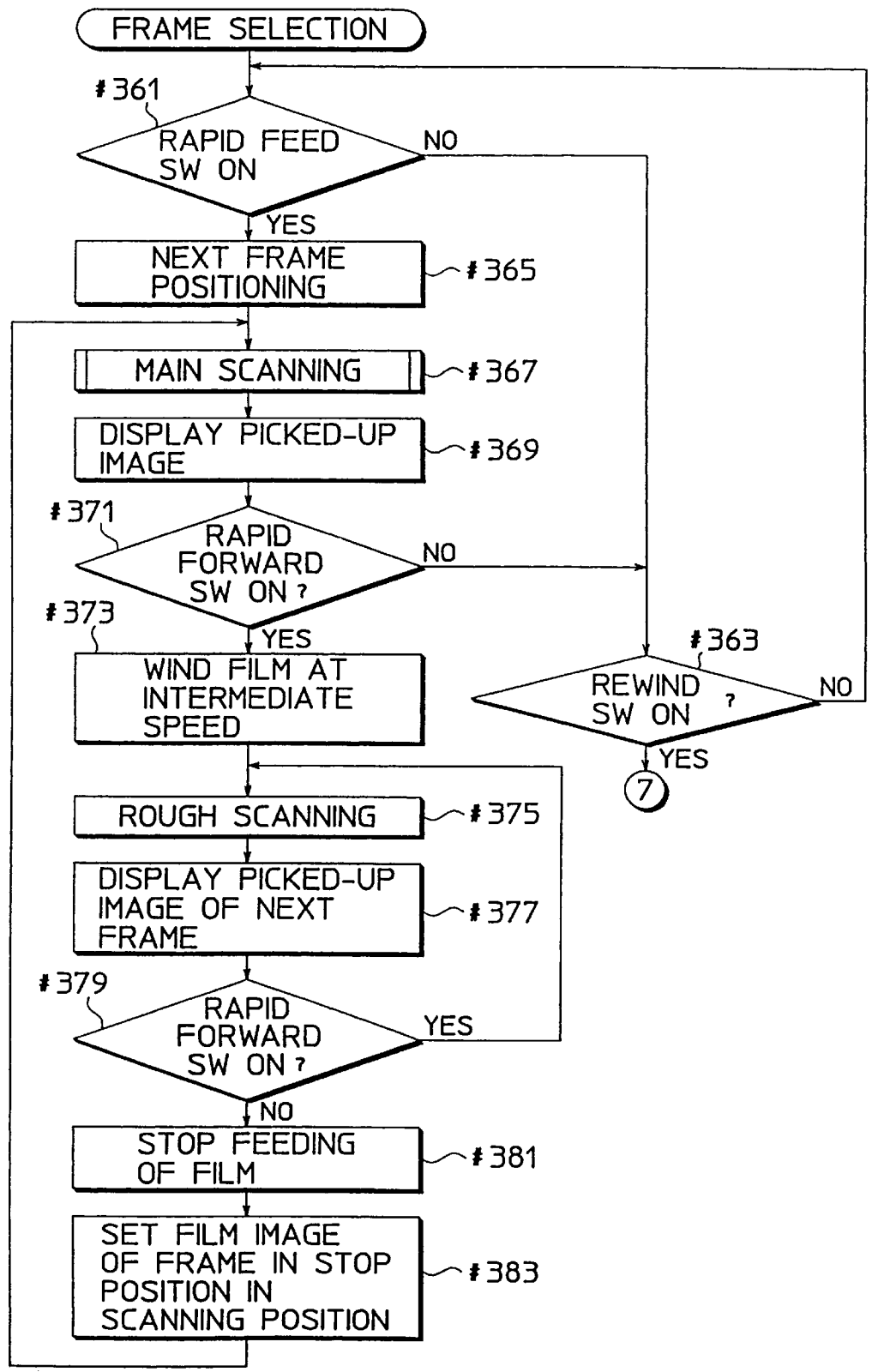
FIGS. 25 and 26 are flowcharts combinedly showing a routine "Frame Selection"
Figure 26:
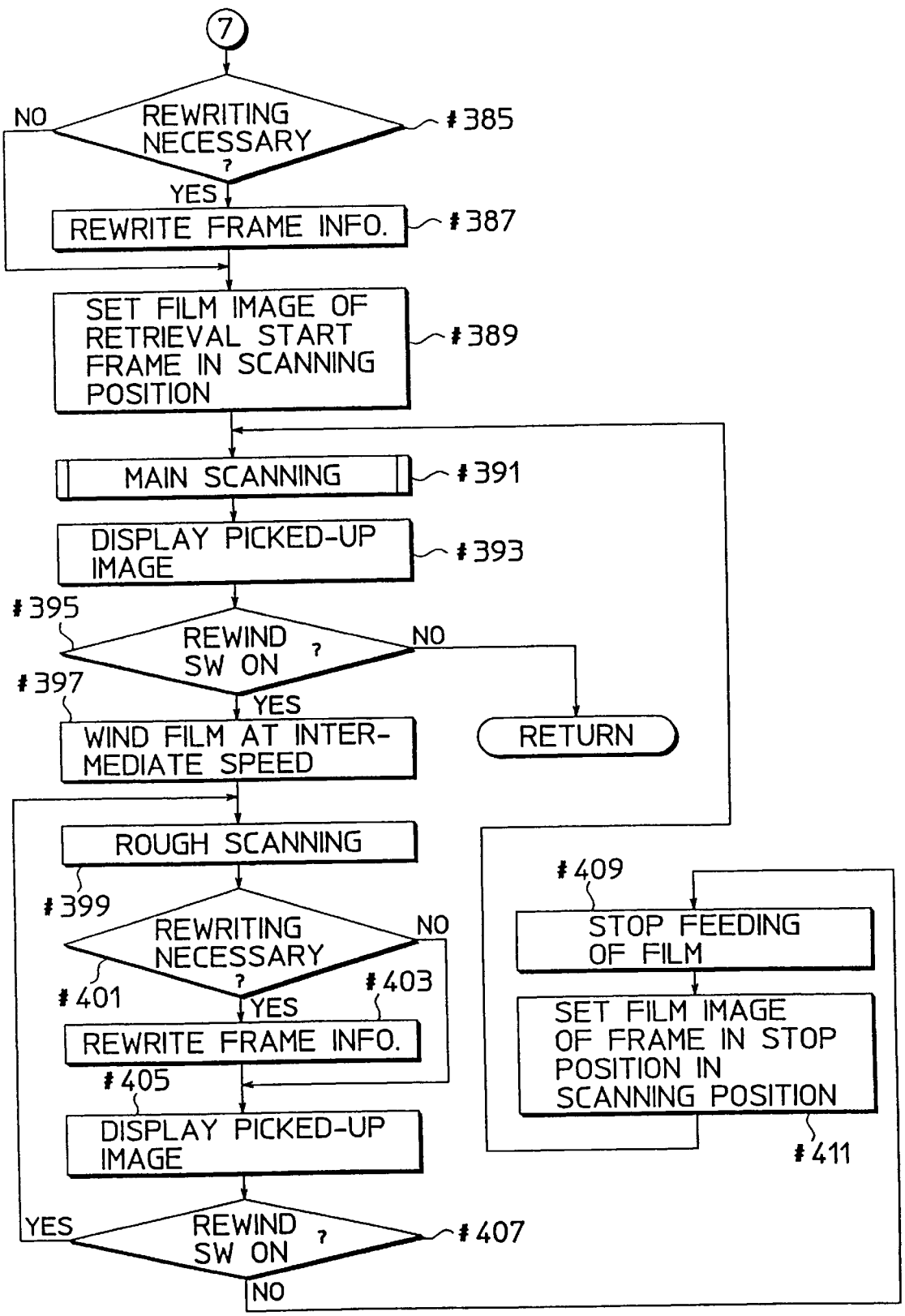

Next, a reproduction control for selectively reproducing and displaying the desired frames F is described with reference to a routine "Frame Selection" shown in FIGS. 25 and 26.

The reproduction for reproducing and displaying the desired frames F is performed in accordance with a specified retrieval mode. For example, when the retrieval mode is set, for example, by operating the mode switch 806, the reproduction is performed in accordance with the routine "Frame Selection."

Upon entering the routine "Frame Selection", it is discriminated whether the rapid forward switch 817 or the rewind switch 813 are on (Steps #361 and #363). For retrieval/reproduction, the rapid forward switch 817 and the rewind switch 813 act as switches for instructing a retrieving direction of the frame F of the film 11.

Figure 33:
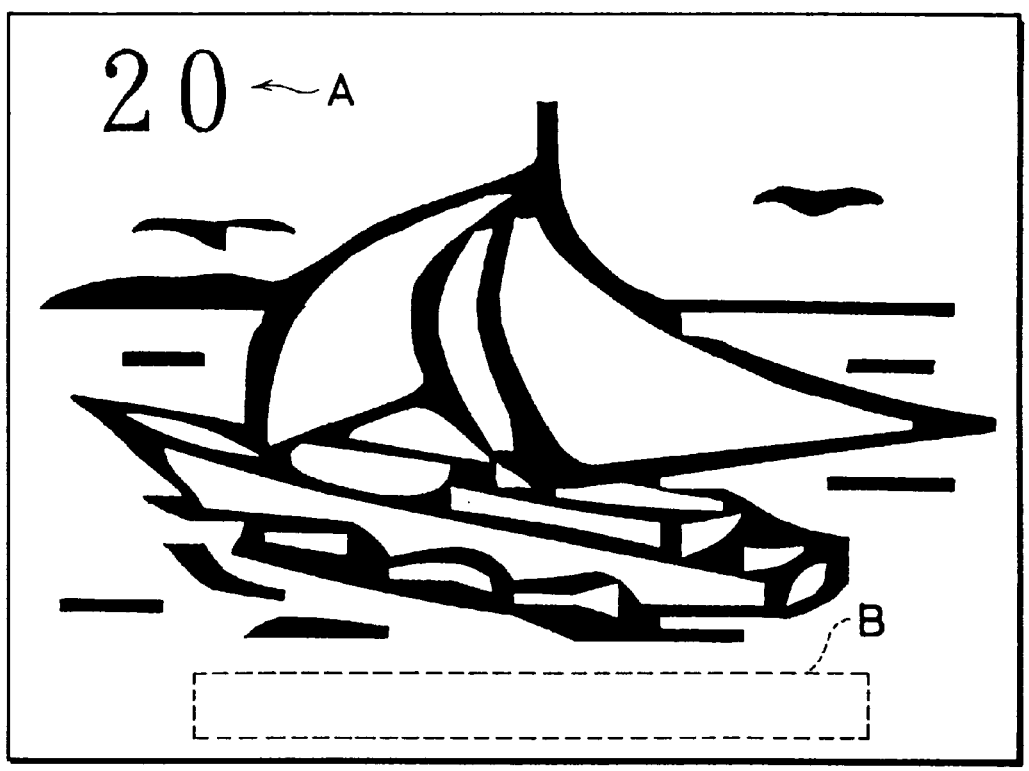
FIG. 33 is a diagram showing an example of a normally reproduced image.

If the rapid feed switch 816 is on (YES in Step #361), the film 11 is rewound to set the next film F in its scanning position (Step #363). Further, the main scanning is performed to pick up the film image (Step #367), and the picked up image is reproduced and displayed on the monitor TV 2 (Step #369). Since the first reproduced frame indicates a retrieval start frame, a normal reproduced image is displayed on the monitor TV 2 as shown in FIG. 33. In this figure. A denotes a frame number and B denotes information such as a date of photographing and a title.

It is then discriminated whether the rapid forward switch 817 is still on (Step #371). If the rapid forward switch 817 is off (NO in Step #371), this routine proceeds to Step #363. If the rapid forward switch 817 is still on (YES in Step #371), the film 11 is wound at intermediate speed (rough scanning at intermediate speed) to pick up the film image of the next frame F and the picked up image is reproduced and displayed on the monitor TV 2 (Steps #373 to #377). While the rapid feed switch 816 is kept on, the film images are successively picked up and displayed on the monitor TV 2 (a loop of Steps #375 to #379).

The rough scanning is performed to pick up the film images for the multi-image. Accordingly, the intermediate speed is higher than the speed at which the film 11 is scanned during the main scanning, but lower than the speed at which the film 11 is normally wound and rewound.

Figure 34:
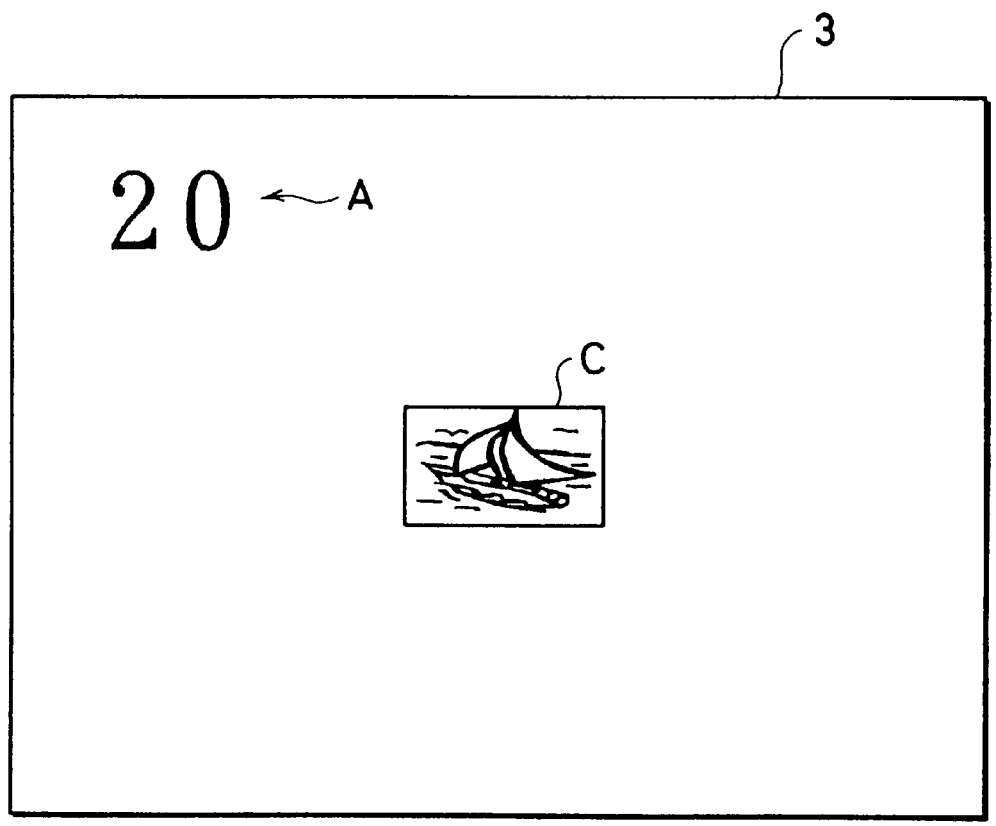
FIG. 34 is a diagram showing an example of a reproduced image during the retrieval/reproduction.

The images for the multi-image as described above are picked up while being compressed, unlike the normal reproduced images (see FIG. 11). Accordingly, as shown in FIG. 34, an image C, smaller than the normal reproduced image, is displayed on the screen 3 of the monitor TV 2. Identified by A in FIG. 34 is a frame number.

The reason why the second and subsequent images are picked up for the multi-image is that these reproduced images are not required to have such a high quality as the normal reproduced images because they are used for the retrieval. Further, the picked up image is not displayed while being enlarged to the normal size of the reproduced image for the following reason. The film image has a low resolution because it is picked up by means of the discontinuous scanning. If the picked up image is reproduced while being enlarged, the quality of the reproduced image is excessively reduced, thereby giving the operator a sense of incongruity or an unpleasant feeling.

If the rapid feed switch 816 is turned off during retrieval/ reproduction (YES in Step #379), the feed of the film 11 is stopped (Step #381). After the film image of the frame F in the stop position is set in its scanning position to display it as a normal reproduced image (Step #383), this routine returns to Step #367. The film image of the frame in the stop position is displayed as a normal reproduced image because this frame F indicates the last retrieved frame.

When the rewind switch 813 is turned on after entering the routine "Frame Selection" or during retrieval/ reproduction (YES in Step #363), retrieval/reproduction is performed in the same way as when the rapid feed switch 816 is pressed (Steps #385 to #411) except that the frame information of the frame F is rewritten during the rough scanning if necessary (see Steps #385, #387, #401 and #403). In other words, Steps #391 to #399 correspond to Steps #367 to #375, and Steps #405 to #411 corresponds to Steps #377 to #383.

Accordingly, when the rewind switch 813 is turned on, it is discriminated whether the rewriting of the frame information is necessary for the retrieval start frame F (Step #385). If the rewriting of the frame information is necessary (YES in Step #385), the frame information is rewritten while the film 11 is rewound to the scanning position of the film image of the retrieval start frame F (Steps #387 and #389). The film image of the retrieval start frame F is picked up as a normal reproduced image by the main scanning, and the picked up image is reproduced and displayed on the monitor TV 2 (Steps #391 and #393).

As to the second and subsequent retrieval frames F, when the rough scanning of the film image of each frame F is started (Step #399), it is discriminated whether the rewriting of the frame information for the frame F is necessary (Step #401). If the discrimination result is in the affirmative (YES in Step #401), the frame information is rewritten during the rough scanning. The film images picked up for the multi-image by the rough scanning are reproduced and displayed on the monitor TV 2 (Steps #399 to #405).

Unlike the retrieval in the winding direction, in the retrieval in the rewinding direction, the film images of the respective frames F are picked up while being scanned from the rear end to the front end. This is because, if the film image of the respective frames F are scanned from the front end to the rear end as in the retrieval in the winding direction, the winding of the film 11 to set the film image of each frame F in its scanning position and the rewinding thereof to pick up the film image have to be alternately performed, thereby making the retrieval/reproduction in the rewinding direction considerably slower than the retrieval/reproduction in the winding direction.

In the retrieval/reproduction in the winding direction, the feeding direction of the film 11 for writing the frame information on the film 11 corresponds with the scanning direction. Further, during the rough scanning of the film images, the film 11 is fed at substantially the same speed as it is fed when the magnetic information is written. Accordingly, this retrieval/reproduction can be performed more efficiently and rapidly by rewriting the necessary frame information during the rough scanning.

In the winding control for the film 11, the film 11 may be wound further than its rear end position due to inertial forces of the drive motor M and the feeding mechanism, thereby being damaged. Thus, in this control, it is necessary to stop the driving of the drive motor M before the film 11 is entirely pulled out of the film cartridge 9, so that the film 11 is not wound any further after it is entirely pulled out of the film cartridge 9.

In this embodiment, the perforation 115 indicating the rear end position of the film end 11C is detected, and the drive motor M is stopped in accordance with this detection.

Figure 27:
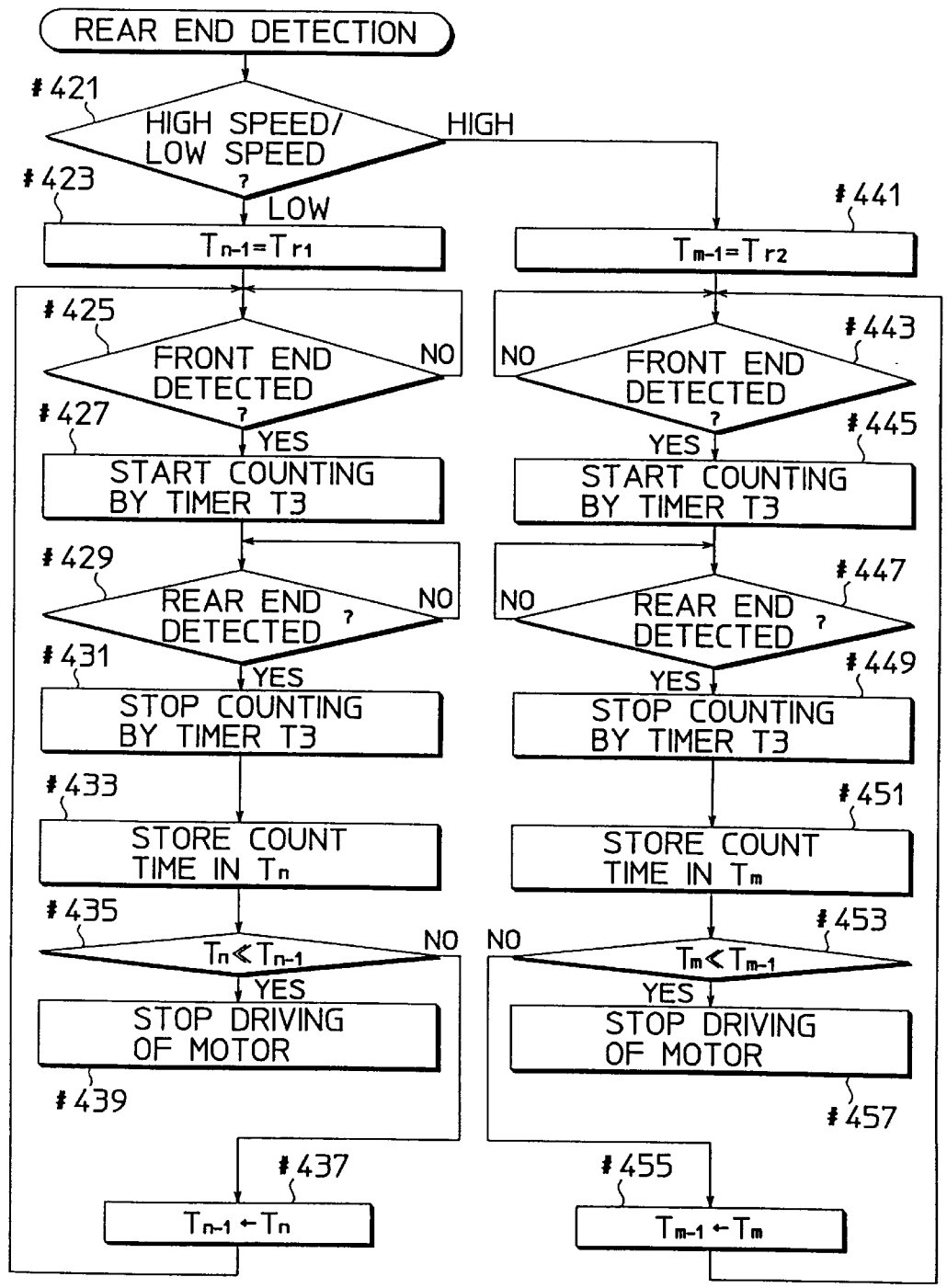
FIG. 27 is a flowchart showing a routine "Rear End Detection"

A control for stopping the drive motor M is executed in accordance with a routine "Rear End Detection" shown in FIG. 27.

The routine "Rear End Detection" is basically as follows. The distance between the perforations 114 and 115 indicating the front and rear end positions of the film end 11C is shorter than the distance between the perforations 111 and 112 indicating the front and rear end positions of each frame F. The film 11 is wound while detecting a feeding time T required to feed the film 11 from the front end position of one frame to the rear end position thereof. When the feeding time T becomes shorter than the previous feeding time T, it is judged that the presently obtained feeding time T is a time required to feed the film 11 from the front end position of the film end 11C to the rear end position thereof. In this way, the perforation 115 indicating the rear end position of the film end 11C is detected.

More specifically, it is discriminated whether the film 11 is fed at low speed (Step #421). If the feeding speed is low in Step #421, this routine proceeds to Step #423 and the rear end position of the film 11 corresponding to the low feeding speed is performed in Steps #423 to #439. If the feeding speed is high in Step #421, this routine proceeds to Step #441 and the rear end detection of the film 11 corresponding to the high feeding speed is performed in Steps #441 to #457.

The rear end detections corresponding to the low and high feeding speeds are basically identical except for reference feeding times Tr1, Tr2 set in first time memories Tn-1, Tm-1. Since Steps #423 to #439 correspond to Steps #441 to #457 and the basic operations are identical, only the rear end detection corresponding to the low feeding speed is described in detail below.

The reference feeding times Tr1, Tr2 are set as T0 for the first frame F because a feeding time T0 for the previous frame F does not exist and an actual feeding time T1 for this frame cannot be compared.

If the feeding speed of the film 11 is low, the predetermined reference feeding time Tr1 is set in the first time memory Tn-1 of the memory 362 (Step #423). Subsequently, when the perforation 111 indicating the front end position of the first frame F after the start of the winding is detected (YES in Step #425), a timer T3 (corresponding to the timer 361 in FIG. 4) starts counting (Step #427). When the perforation 112 indicating the rear end position of the first frame F is detected (YES in Step #429), the counting by the timer T3 is stopped (Step #431). The count time (feeding time) T1 is stored in a second time memory Tn of the memory 362 (Step #433).

Subsequently, the count time T1 stored in the first time memory Tn-1 is compared with the reference feeding time Tr1 stored in the second time memory Tn to discriminate whether the count time T is considerably shorter than the reference feeding time Tr1 (Step #435). If the count time T1 is considerably shorter than the reference feeding time Tr1 (YES in Step #435), the driving of the drive motor M is stopped upon the judgment that the perforation detected in Step #427 is the perforation 115 indicating the rear end position of the film end 11C (Step #439).

If the count time T1 is substantially equal to the reference feeding time (NO in Step #435), the count time T1 is written over the content of the first time memory Tn-1 (Step #437), and this routine returns to Step #425. A feeding time T2 for the second frame F is counted and written over the content of the second time memory Tn in Steps #425 to #433.

The feeding time T2 for the present frame F which is stored in the first time memory is compared with the feeding time T1 for the previous frame F which is stored in the second time memory Tn to discriminate whether the feeding time T2 is considerably shorter than the feeding time T1 (Step #435).

If the feeding time T2 is considerably shorter than the feeding time T1 (YES in Step #435), the driving of the drive motor M is stopped upon the judgment that the perforation detected in Step #427 is the perforation 115 indicating the rear end position of the film end 11C (Step #439). If the count time T2 is substantially equal to the feeding time T1 (NO in Step #435), the count time T2 is written over the content of the first time memory Tn-1 (Step #437), and this routine returns to Step #425.

Hereafter, every time the feeding time Tn of the frame F is detected, the feeding time Tn for the present frame F is compared with the feeding time Tn-1 for the previous frame. If the feeding time Tn is considerably shorter than the feeding time Tn-1 (YES in Step #435), the driving of the drive motor M is stopped upon the judgment that the perforation detected in Step #427 is the perforation 115 indicating the rear end position of the film end 11C (Step #439).

In this embodiment, the drive motor M is stopped upon detecting the perforation 115 indicating the rear end position of the film end 11C. However, a mark indicating the film end 11C may be affixed to the film 11, and the drive motor M may be stopped upon detecting this mark. Alternatively, the frame numbers given to the respective frames F may be detected, and when the maximum frame number is detected, the drive motor M may be stopped upon the judgment that the film 11 has been fed to the film end 11C. Further, a distance the film 11 is pulled out of the film cartridge 9 may be detected, and the drive motor M may be stopped when the film 11 is pulled by longer than a specified distance.

As described above, according to the invention, in the reproducing apparatus for picking up the film images recorded in the respective frames of the developed film, reproducing and displaying the picked up images, upon an instruction to turn the power off, a discrimination is made as to whether or not the developed film is still loaded. If the developed film is still loaded, the power generation means is stopped after the developed film is rewound into the film cartridge. Thus, the developed film will not be left exposed from the film cartridge, thereby being protected from color fade-out and stains resulting from dusts or the like.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A film image reproducing apparatus for reproducing film images which are recorded on successive frames of a film, the film reproducing apparatus comprising:

an illuminator, having an illuminating characteristic, to illuminate the film for reproducing a film image therefrom;

a detector which detects the illuminating characteristic of the illuminator;

a recorder which records on the film the illuminating characteristic of the illuminator as detected by the detector;

a setter which sets, based on the illuminating characteristic, a condition for picking up a film image from the film; and a picking-up device which picks up the film image for reproducing the film image at the set picking-up condition.

2. A film image reproducing apparatus as defined in claim 1, further comprising a discriminator which discriminates whether an illuminating characteristic is recorded on the film.

3. A film image reproducing apparatus as defined in claim 2, wherein:

the setter is caused to set the picking-up condition based on an illuminating characteristic recorded on the loaded film when the discriminator discriminates the recorded illuminating characteristic on the film; and the recorder is caused to record the illuminating characteristic of the illuminator on the film when the discriminator discriminates no recorded illuminating characteristic on the film.

4. A film image reproducing apparatus as defined in claim 1, wherein the detector detects the illuminating characteristic based on the illuminator illuminating a portion of the film having no film images.

5. A film image reproducing apparatus as defined in claim 1, wherein the recorder records the illuminating characteristic of the illuminator on a leader portion of the film.

6. A film image reproducing apparatus as defined in claim 5, wherein the recorder includes a magnetic recording device.

7. A film image reproducing apparatus as defined in claim 1, wherein the illuminating characteristic of the illuminator includes a brightness of light produced by the illuminator.

8. A film image reproducing apparatus as defined in claim 1, wherein the illuminating characteristic of the illuminator includes a color of light produced by the illuminator.

9. A film image reproducing apparatus for reproducing film images which are recorded on successive frames of a film, the film image reproducing apparatus comprising:

an illuminator, having an illuminating characteristic, to illuminate the film for reproducing a film image therefrom;

a detector which detects an illuminating characteristic of the illuminator;

a reader which reads reproduction information recorded on the film;

a setter which sets a condition for picking up a film image based upon the detected illuminating characteristic of the illuminator and the read reproduction information; and a picking-up device which picks up the film image for reproducing the film image at the set picking-up condition.

10. A film image reproducing apparatus as defined in claim 9, wherein the film has a magnetic recording portion, and the reproduction information is recorded in the magnetic recording portion.

11. A film image reproducing apparatus as defined in claim 10, wherein the reproduction information includes a previous illuminating characteristic and a previous picking-up condition.

12. A film image reproducing apparatus as defined in claim 11, wherein the setter sets the picking-up condition based on the detected illuminating characteristic of the illuminator and the previous illuminating characteristic.

13. A film image reproducing apparatus as defined in claim 12, wherein the setter includes a correction discriminator which discriminates, based on a comparison between the previous illuminating characteristic and the detected illuminating characteristic of the illuminator, whether it is necessary to correct the previous picking-up condition.

14. A film image reproducing apparatus as defined in claim 9, wherein the detector detects the illuminating characteristic of the illuminator based on light illuminating a portion of the film having no film images.

15. A film image reproducing apparatus as defined in claim 9, wherein the recorder records the illuminating characteristic of the illuminator on a leader portion of the film.

16. A film image reproducing apparatus as defined in claim 9, wherein the illuminating characteristic of the illuminator includes a brightness of light produced by the illuminator.

17. A film image reproducing apparatus as defined in claim 9, wherein the illuminating characteristic of the illuminator includes a color of light produced by the illuminator.

18. A film image reproducing apparatus for reproducing film images which are recorded on successive frames of a film, the film image reproducing apparatus comprising:

an illuminator, having a first illuminating characteristic and a second illuminating characteristic, to illuminate the film for reproducing a film image therefrom;

a detector which detects the first illuminating characteristic of the illuminator and the second illuminating characteristic of the illuminator, wherein the first illuminating characteristic differs from the second illuminating characteristic; and a setter which sets a condition for picking up a film image based on the first and second illuminating characteristics detected by the detector.

19. A film image reproducing apparatus as defined in claim 18, wherein the film has a magnetic recording portion, and the first illuminating characteristic of the illuminator is recorded on the magnetic recording portion.

20. A film image reproducing apparatus as defined in claim 19, wherein the magnetic recording portion is provided in a leader portion of the film.

21. A film image reproducing apparatus as defined in claim 19, wherein a set picking-up condition is recorded on the magnetic recording portion.

22. A film image reproducing apparatus as defined in claim 21, wherein the setter includes a correction discriminator which discriminates, based on a comparison between the first and second illuminating characteristics, whether it is necessary to correct a previous set picking-up condition.

23. A film image reproducing apparatus as defined in claim 18, wherein the detector includes a sensor which senses light which has been produced by the illuminator and transmitted through the film, and the second illuminating characteristic is detected based on light sensed by the sensor.

24. A film image reproducing apparatus as defined in claim 23, wherein the second illuminating characteristic of the illuminator is detected based on light which has been transmitted through a portion of the film which has no film images.

25. A film image reproducing apparatus as defined in claim 18, wherein the illuminating characteristic of the illuminator includes a brightness of light produced by the illuminator.

26. A film image reproducing apparatus as defined in claim 18, wherein the illuminating characteristic of the illuminator includes a color of light produced by the illuminator.

27. A film image reproducing apparatus for reproducing images which are recorded on successive frames of a film, the film reproducing apparatus comprising:

an illuminator, having an illuminating characteristic, to illuminate the film for reproducing a film image therefrom;

a detector;

a recorder which records on the film the illuminating characteristic of the illuminator; and a setter which sets, based on the illuminating characteristic, a condition for picking up a film image, wherein the detector operates in a first mode to detect the illuminating characteristic and operates in a second mode to pick up the film image for reproducing the film image at the set picking-up condition.

28. A film image reproducing apparatus as defined in claim 27, further comprising a discriminator which discriminates whether an illuminating characteristic is recorded on the film.

29. A film image reproducing apparatus as defined in claim 28, wherein:

the setter is caused to set the picking-up condition based on an illuminating characteristic recorded on the loaded film when the discriminator discriminates the recorded illuminating characteristic on the film; and the recorder is caused to record the illuminating characteristic of the illuminator on the film when the discriminator discriminates no recorded illuminating characteristic on the film.

30. A film image reproducing apparatus as defined in claim 27, wherein the detector detects the illuminating characteristic of the illuminator based on light illuminating a portion of the film having no film images.

31. A film image reproducing apparatus as defined in claim 27, wherein the recorder records the illuminating characteristic of the illuminator on a leader portion of the film.

32. A film image reproducing apparatus as defined in claim 27, wherein the recorder includes a magnetic recording device.

33. A film image reproducing apparatus as defined in claim 27, wherein the illuminating characteristic of the illuminator includes a brightness of light produced by the illuminator.

34. A film image reproducing apparatus as defined in claim 27, wherein the illuminating characteristic of the illuminator includes a color of light produced by the illuminator.

35. A film image reproducing apparatus for reproducing film images which are recorded on successive frames of a film, the film image reproducing apparatus comprising:

an illuminator, having an illuminating characteristic, to illuminate the film for reproducing a film image therefrom;

a detector which detects an illuminating characteristic of the illuminator;

a reader which reads reproduction information recorded on the film; and a setter which sets a condition for picking up a film image based upon the detected illuminating characteristic of the illuminator and the read reproduction information, wherein the detector further picks up the film image for reproducing the film image at the set picking-up condition.

36. A film image reproducing apparatus as defined in claim 35, wherein the film has a magnetic recording portion, and the reproduction information is recorded in the magnetic recording portion.

37. A film image reproducing apparatus as defined in claim 36, wherein the reproduction information includes a previous illuminating characteristic and a previous picking-up condition.

38. A film image reproducing apparatus as defined in claim 37, wherein the setter sets the picking-up condition based on the detected illuminating characteristic of the illuminator and the previous illuminating characteristic.

39. A film image reproducing apparatus as defined in claim 38, wherein the setter includes a correction discriminator which discriminates, based on a comparison between the previous illuminating characteristic and the detected illuminating characteristic of the illuminator, whether it is necessary to correct the previous picking-up condition.

40. A film image reproducing apparatus as defined in claim 35, wherein the detector detects the illuminating characteristic of the illuminator based on light illuminating a portion of the film having no film images.

41. A film image reproducing apparatus as defined in claim 35, wherein the recorder records the illuminating characteristic of the illuminator on a leader portion of the film.

42. A film image reproducing apparatus as defined in claim 35, wherein the illuminating characteristic of the illuminator includes a brightness of light produced by the illuminator.

43. A film image reproducing apparatus as defined in claim 35, wherein the illuminating characteristic of the illuminator includes a color of light produced by the illuminator.

* * * * *

UNITED STATES PATENT AND TRADEMARK OFFICE
CERTIFICATE OF CORRECTION

PATENT NO : 6,100,919

DATED : August 8, 2000

INVENTOR(S): Manabu INOUE and Hirokazu YAGURA

It is certified that error appears in the above-identified patent and that said Letters Patent is hereby corrected as shown below:

Cover page, [54], in the title, delete "FILM IMAGE REPRODUCTION APPARATUS UTILIZING APPARATUS ILLUMINATION CHARACTERISTICS FOR FILM IMAGE REPRODUCTION", and insert --IMAGE REPRODUCTION APPARATUS UTILIZING APPARATUS ILLUMINATION CHARACTERISTICS FOR FILM IMAGE REPRODUCTION--.

Column 1, lines 1-4, delete "FILM IMAGE REPRODUCTION APPARATUS UTILIZING APPARATUS ILLUMINATION CHARACTERISTICS FOR FILM IMAGE REPRODUCTION", and insert --IMAGE REPRODUCTION APPARATUS UTILIZING APPARATUS ILLUMINATION CHARACTERISTICS FOR FILM IMAGE REPRODUCTION--.

UNITED STATES PATENT AND TRADEMARK OFFICE
CERTIFICATE OF CORRECTION

PATENT NO : 6,100,919

DATED : August 8, 2000

INVENTOR(S): Manabu INOUE and Hirokazu YAGURA

It is certified that error appears in the above-identified patent and that said Letters Patent is hereby corrected as shown below:

Cover page, [75], Inventors:, delete "Manabu Inoue, Kobe; Tsutomu Honda, Sakai, Toru Ishii, Hirakata, Hirokazu Yagura, Sakai, Hideki Nagata, Sakai; Katsuyuki Nanba, Sakai; Kiyoyuki Tomita, Kawachinagano; Yumi Hasegawa, Osaka; Toshiyuki Murai, Nara-ken; all of Japan", and insert --Manabu Inoue, Kobe-Shi; Hirokazu Yagura, Sakai-Shi, both of Japan--.

Cover page, [30], Foreign Application Priority Data, second document listing, document number, delete "8-214086" and insert --6-214086--.

Signed and Sealed this

Twenty-fourth Day of April, 2001

*Attest:*

NICHOLAS P. GODICI

*Attesting Officer*   *Acting Director of the United States Patent and Trademark Office*